(12) United States Patent
Patel et al.

(10) Patent No.: US 11,907,230 B1
(45) Date of Patent: Feb. 20, 2024

(54) SYSTEM AND METHOD FOR DISTRIBUTED MANAGEMENT OF HARDWARE BASED ON INTENT

(71) Applicant: Dell Products L.P., Round Rock, TX (US)

(72) Inventors: Dharmesh M. Patel, Round Rock, TX (US); Lucas A. Wilson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/152,233

(22) Filed: Jan. 10, 2023

(51) Int. Cl.
*G06F 16/00* (2019.01)
*G06F 16/2457* (2019.01)
*G06N 5/043* (2023.01)
*G06F 16/242* (2019.01)
*G06F 16/248* (2019.01)

(52) U.S. Cl.
CPC ...... *G06F 16/24575* (2019.01); *G06F 16/243* (2019.01); *G06F 16/248* (2019.01); *G06N 5/043* (2013.01)

(58) Field of Classification Search
CPC . G06F 16/24575; G06F 16/243; G06F 16/248
See application file for complete search history.

(56) References Cited

U.S. PATENT DOCUMENTS

| 8,024,225 | B1 | 9/2011 | Sirota et al. | |
| 8,750,231 | B1 | 6/2014 | Martini | |
| 9,531,607 | B1 | 12/2016 | Pai et al. | |
| 10,025,653 | B2 * | 7/2018 | Goldstein | G05B 23/0275 |
| 10,089,676 | B1 | 10/2018 | Gupta et al. | |
| 10,860,587 | B2 * | 12/2020 | Koukoumidis | G06F 16/387 |
| 11,036,554 | B1 | 6/2021 | Prock et al. | |
| 11,132,457 | B2 | 9/2021 | Spektor et al. | |
| 11,159,646 | B1 | 10/2021 | Singh | |

(Continued)

FOREIGN PATENT DOCUMENTS

| CN | 114730269 A | 7/2022 |
| KR | 20110008272 A | 1/2011 |

(Continued)

OTHER PUBLICATIONS

"Monitoring for DPU capacity planning", AWS Glue, Accessed Sep. 6, 2022, Web Page <https://docs.aws.amazon.com/glue/latest/dg/monitor-debug-capacity.html> (7 Pages).

*Primary Examiner* — Noosha Arjomandi
(74) *Attorney, Agent, or Firm* — Womble Bond Dickinson (US) LLP

(57) ABSTRACT

Methods and systems for managing distributed systems are disclosed. The distributed systems may include any number of data processing systems that may contribute to the functionality of the distributed system. To contribute to the functionality of the distributed system, each of the data processing systems may need to be configured to positively contribute to one or more functions. To manage configuration of data processing system, user input reflecting the intents of users may be obtained. The user input may reflect responses to multiple inquires which may elucidate a user's true intent with respect to user of services provided by data processing systems.

20 Claims, 11 Drawing Sheets

(56) References Cited

U.S. PATENT DOCUMENTS

| | | | |
|---|---|---|---|
| 11,269,872 B1* | 3/2022 | Moo | G06F 16/243 |
| 11,323,317 B1 | 5/2022 | Levin et al. | |
| 11,501,763 B2* | 11/2022 | Panchamgam | G10L 15/26 |
| 11,522,976 B1 | 12/2022 | Baker | |
| 11,632,315 B1 | 4/2023 | Sawal et al. | |
| 11,706,289 B1* | 7/2023 | Patel | H04L 67/51 |
| | | | 709/203 |
| 11,831,706 B1* | 11/2023 | Patel | H04L 67/10 |
| 11,841,846 B1* | 12/2023 | Kothari | G06F 16/2365 |
| 2007/0217335 A1 | 9/2007 | Jayaraman et al. | |
| 2008/0208672 A1 | 8/2008 | Van Riel et al. | |
| 2009/0010264 A1 | 1/2009 | Zhang | |
| 2010/0017506 A1 | 1/2010 | Fadell | |
| 2011/0238498 A1 | 9/2011 | Hassan et al. | |
| 2011/0275344 A1 | 11/2011 | Momtahan et al. | |
| 2012/0003923 A1 | 1/2012 | Pazos et al. | |
| 2012/0304191 A1 | 11/2012 | Morgan | |
| 2014/0059227 A1 | 2/2014 | Esserman et al. | |
| 2014/0181285 A1 | 6/2014 | Stevens et al. | |
| 2014/0187199 A1 | 7/2014 | Yan et al. | |
| 2014/0297521 A1 | 10/2014 | Das et al. | |
| 2014/0357289 A1 | 12/2014 | Smith et al. | |
| 2016/0132310 A1 | 5/2016 | Koushik et al. | |
| 2016/0321097 A1 | 11/2016 | Zhu et al. | |
| 2017/0063946 A1 | 3/2017 | Quan et al. | |
| 2019/0171438 A1 | 6/2019 | Franchitti | |
| 2019/0173757 A1 | 6/2019 | Hira et al. | |
| 2019/0347181 A1 | 11/2019 | Cranfill et al. | |
| 2019/0384893 A1 | 12/2019 | Suda | |
| 2020/0186619 A1 | 6/2020 | Huber et al. | |
| 2020/0236116 A1 | 7/2020 | Bower et al. | |
| 2020/0363959 A1 | 11/2020 | Kesavan et al. | |
| 2021/0124744 A1 | 4/2021 | Gladwin et al. | |
| 2021/0182940 A1 | 6/2021 | Gupta et al. | |
| 2021/0200486 A1 | 7/2021 | Mizui | |
| 2021/0360074 A1 | 11/2021 | Long | |
| 2021/0360083 A1 | 11/2021 | Duggal et al. | |
| 2021/0397308 A1 | 12/2021 | Rahman et al. | |
| 2022/0121623 A1* | 4/2022 | Lyske | G06F 9/52 |
| 2022/0124009 A1 | 4/2022 | Metsch et al. | |
| 2022/0164838 A1 | 5/2022 | Wang | |
| 2022/0237232 A1* | 7/2022 | Quamar | G06F 16/26 |
| 2022/0261406 A1* | 8/2022 | Bhuiyan | G06F 16/2457 |
| 2022/0318423 A1* | 10/2022 | Shu | G06F 21/6245 |
| 2023/0072837 A1 | 3/2023 | Brown et al. | |
| 2023/0111811 A1 | 4/2023 | Tran | |
| 2023/0128497 A1* | 4/2023 | Vijayan | G06F 16/90332 |
| | | | 707/690 |
| 2023/0169080 A1* | 6/2023 | Iyer | G06N 3/044 |
| | | | 707/756 |
| 2023/0206329 A1* | 6/2023 | Cella | G06F 21/44 |
| 2023/0237059 A1* | 7/2023 | Zweig | G06F 16/24575 |
| 2023/0297540 A1* | 9/2023 | Khan | G06F 16/2358 |
| | | | 707/694 |
| 2023/0402766 A1* | 12/2023 | Garyantes | H01Q 21/08 |
| 2023/0409584 A1* | 12/2023 | Venkatesan | H03M 7/30 |

FOREIGN PATENT DOCUMENTS

| | | |
|---|---|---|
| KR | 20130015327 A | 2/2013 |
| WO | 2012173604 A2 | 12/2012 |

\* cited by examiner

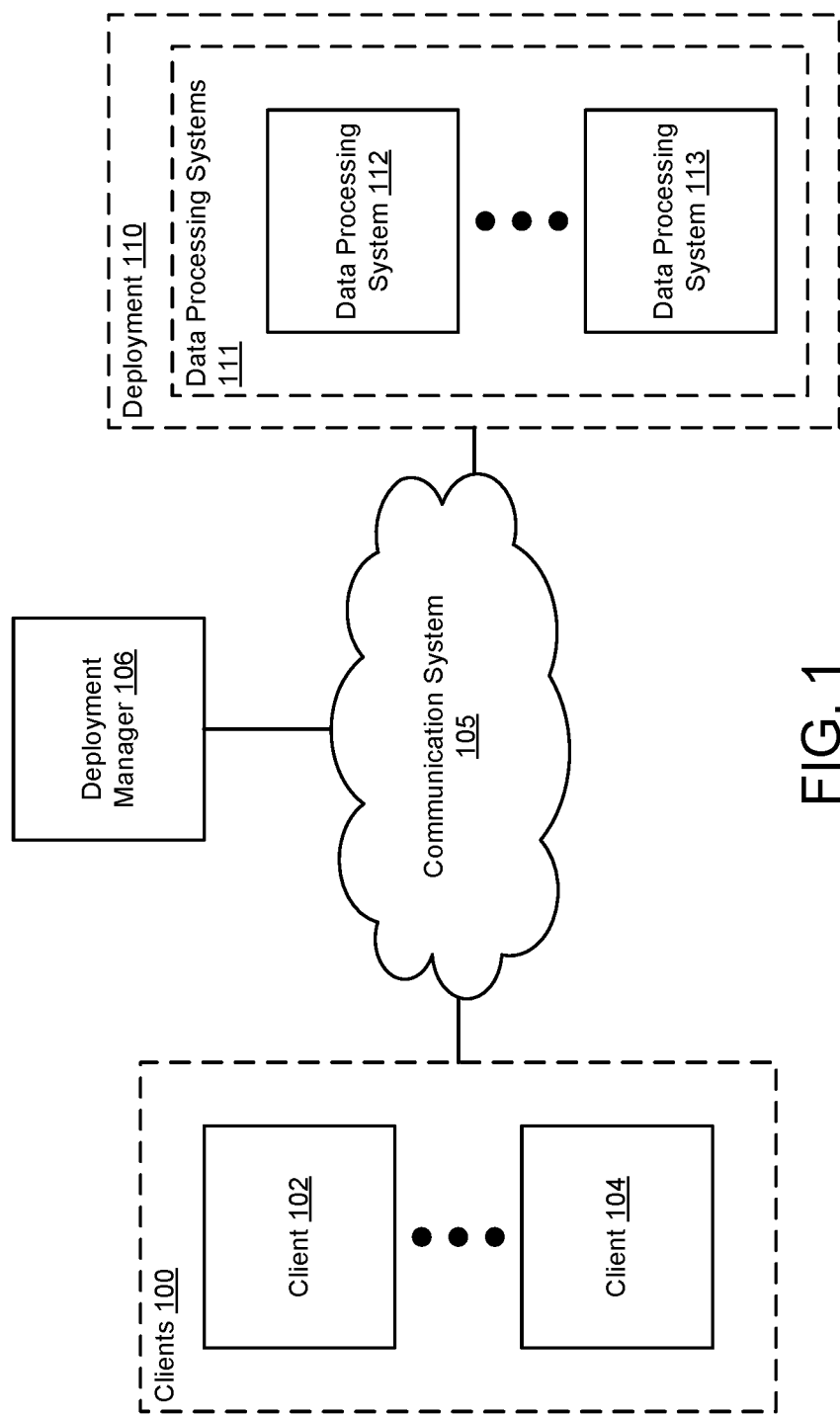

SYSTEM AND METHOD FOR DISTRIBUTED MANAGEMENT OF HARDWARE BASED ON INTENT

FIELD OF THE DISCLOSED EMBODIMENTS

Embodiments disclosed herein relate generally to distributed management. More particularly, embodiments disclosed herein relate to systems and methods for distributed control plane management of distributed systems.

BACKGROUND

Computing devices may store data and used stored data. For example, computing devices may utilize data when providing computer implemented services. The ability of computing devices to perform different types of computer implemented services may depend on the types and quantities of available computing resources.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
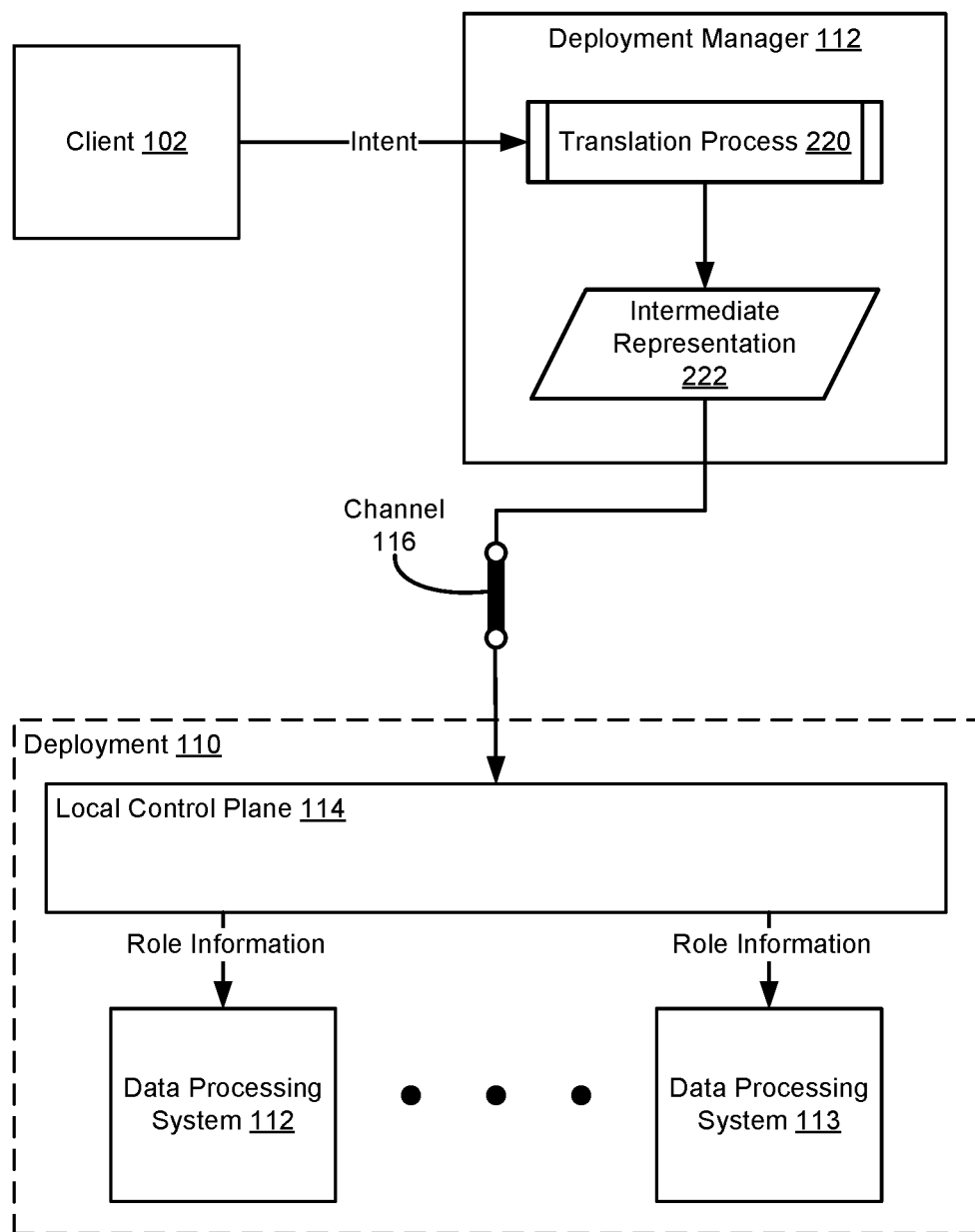
FIGS. 2A-2F show data flow diagrams illustrating data used and processing performed by a system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing distributed system. The distributed system may include any number of data processing systems that may contribute to the functionality of the distributed system. To contribute to the functionality of the distributed system, each of the data processing systems may need to be configured in a manner that allows the data processing systems to contribute to providing one or more functionalities.

To manage configuration of data processing system, a distributed control plane may be utilized. The distributed control plane may vest decision making authority at different levels of a hierarchy used to manage the data processing systems.

The distributed control plane may allow management entities to receive information regarding the intents of users that may desire to receive services from the data processing systems, and decide on roles to be implemented to meet the intents of the users. In the event that information reflect the intents of the users is to some extent contradictory, a resolution process may be performed to finalize the intents of the users. The finalization process may include gather additional information through which the actual intent of the user may be identified. The finalized intent may then be used to identify roles through which desired services may be provided.

The roles may be defined by an intermediate representation that does not rigidly express how each of the data processing systems is to be configured, the software to be hosted by the data processing systems, etc. Rather, the roles may define metrics usable to evaluate the capability of a data processing system with a particular configuration to take on a role.

The intermediate representation may allow groups of data processing systems (e.g., a deployment) to establish their respective configurations for providing services requested by a user.

By doing so, embodiments disclosed herein may improve the reliability of services provided by data processing systems. For example, in the context of distributed systems, information regarding intent of users may be obtained through interfaces that are imperfect. Consequently, an actual intent of a user may be misunderstood. To reduce the likelihood of misunderstanding the intents of users, multiple pieces of user input may be obtained and correlated with one another to ascertain whether any contradictions exist. If contradictions exist, processes to resolve these contradictions (e.g., differences) may be performed prior to implementing services based on the intents of the user. By doing so, services provided to users are more likely to be desired by meeting the actual intent of the users. Thus, embodiments disclosed herein may address the technical challenge of limited resources by reducing the likelihood that resources are wasted on services that are not actually desired by the users.

In an embodiment, a computer-implemented method for managing services provided using data processing systems is provided. The method may include obtaining, using a graphical user interface, user input from a user, the user input including information regarding a service of the services to be provided using the data processing systems; identifying an explicit intent conveyed by the user input; identifying an inferred intent conveyed by the user input; making a determination regarding whether the explicit intent and the inferred intent are different; in an instance of the determination where the explicit intent and the inferred intent are different: initiating performance of an intent resolution action set to obtain a finalized intent for the user, the intent resolution action set comprising at least one action selected from a group of actions consisting of: obtaining second user input indicating a response to a question based on the difference, obtaining third user input indicating a response to presentation of a simulated environment based on the explicit intent and the inferred intent, and obtaining a data package indicating use of a computing environment by the user; obtaining an intermediate representation based on the finalized intent; and providing use of the data processing systems to a client using the intermediate representation.

Obtaining the second user input indicating the response to the question based on the difference may include obtaining the question based at least in part on the difference; presenting the question to the user or a second user via a second graphical user interface; and obtaining the second user input via the second graphical user interface. The user and the second user may be representatives of the client.

Obtaining the third user input indicating the response to the presentation of the simulated environment based on the explicit intent and the inferred intent may include generating, based on the explicit intent and the inferred intent, a second intermediate representation; instantiating, using the second intermediate representation and the data processing systems, a temporary computing environment; presenting, to the user or the second user, the temporary computing environment; obtaining the third user input via a third graphical user interface, the third user input being provided by the user or the second user responsive to the presentation of the temporary computing environment.

The explicit intent may indicate a first quantity of computing resources, the inferred intent indicates a second quantity of computing resources, and the intermediate representation implicates deployment of a quantity of computing resources between the first quantity of computing resources and the second quantity of computing resources.

The third user input may indicate a quality rating of computer implemented services provided by the temporary computing environment. For example, the third user input may be obtained with a sliding scale or other elements through which a user may indicate the appreciated quality of the computer implemented services.

Obtaining the data package indicating use of the computing environment by the user may include identifying a metric based at least in part on the difference; instantiating an agent in the computing environment, the computing environment being used by the client to receive computer implemented services; monitoring, using the agent, the metric with respect to the computer implemented services; and obtaining the data package based on the monitoring of the metric.

In an instance of the intent resolution action set that comprises the obtaining of the data package, the intent resolution action set may also include scaling a number of instances of roles of the intermediate representation based on the data package and a threshold.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include, but is not limited to, one or more clients 100, deployment 110, and a communication system 105 that facilitates operable connections between all, or a portion, of the components illustrated in FIG. 1. Each of these components is discussed below.

All, or a portion, of clients 102-104 may provide services to users of clients 100 and/or to other devices operably connected to clients 100. To provide services (e.g., computer implemented services) to users or other devices, clients 100 may utilize services provided by deployment 110. Deployment 110 may provide any type and quantity of computer implemented services. The computer implemented services provided by deployment 110 may be specified by clients 100 and/or other entities.

To provide the computer implemented services to clients 100, deployment 110 may include any number of data processing systems 112-113. The data processing systems may each provide respective computer implemented services. The data processing systems may provide similar and/or different computer implemented services. All, or a portion, of the computer implemented services may be provided cooperatively by multiple data processing systems while other computer implemented services may be provided independently by various data processing systems.

In aggregate, the computer implemented services provided by deployment 110 may provide one or more overall solutions (e.g., a solution architecture, a solution service, etc.). An overall solution may be provided when deployment 110 provides one or more predetermined services.

For example, consider a scenario where deployment 110 provides tiered data storage services to clients 100. To provide the tiered data storage services, data processing systems 112-113 may need to (i) intake data, (ii) select a storage location for data, (iii) preprocess the data prior to storage (e.g., deduplication), (iv) store the data in the storage location, and (v) migrate the data between storage locations so as to properly tier the data as its relevance/importance changes over time. To provide functionalities (i)-(v), various data processing systems of deployment 110 may need to be appropriately configured (e.g., specific hardware settings, software settings, firmware, operating systems, service applications, etc.) with some data processing systems being configured differently.

However, depending on the capabilities of data processing systems 112-113, any of the data processing systems may not be able to be configured in accordance with a static or rigid specification. For example, any of the data processing systems may lack hardware or functionalities to provide certain services as part of a solution architecture, any of the hardware may already be in use for other types of services and may not be reconfigurable (e.g., without impacting the already-provided services), any of the data processing systems may lack certain software or may host software that may conflict with software specified for a static configuration, etc.

Further, to provide aggregate functionality, data processing systems 112-113 may need to perform various functions that complement one another. If one of these functionalities is not provided, then the aggregate functionality may be impaired (e.g., provided at a lesser level of quality than desired, not provided at all, etc.).

Additionally, deployment 110 may be implemented as an edge system where resources (e.g., power, computing capability, etc.) and connectivity (e.g., between data processing systems 111, deployment manager 106, and clients 100) is limited and/or intermittent. Accordingly, the capabilities of the system of FIG. 1 may change dynamically over time.

In general, embodiments disclosed herein relate to systems, methods, and devices for managing the configurations of data processing systems of a deployment to provide services desired by user of clients. The configurations of the data processing systems may be managed using an intermediate representation of roles that, when fulfilled, are likely to successfully effectuate an intent of a user that requests that a solution service or architecture (and/or other expression of intent) be provided.

Rather than specifying static or rigid configurations, the intermediate representation of the roles may be used to evaluate whether a data processing system may be configured in various manners to perform any of the roles. The intermediate representation of the roles may be used by a distributed control plane to identify and configure data processing systems to effectuate the intent of the user.

The intermediate representation may be established based on input from a user. For example, the user may provide information regarding desired services. However, some of the information may appear to be contradictory. For example, the user may explicitly indicate one type of intent with respect to services, but other selections may indicate (e.g., it may be inferred) that another intent for the services may be present.

To resolve such conflict, a resolution process may be performed in which additional information may be obtained from the user. The information may be obtained via one or more procedures which may include (i) obtaining additional user input via a questionnaire that includes questions having answers that may resolve the difference between the explicit and inferred intent, (ii) obtaining additional user input via simulation of services that will be provided to the user based on the explicit and inferred intents and through which the user may experience and provide feedback on the services, (iii) obtaining a data package reflecting user of existing services by a client of which the user is a representative to ascertain how the existing services are being used, and/or (iv) other procedures. The obtain information may be used to finalize an understanding of the intent of the user. The intermediate representation may then be generated based on the finalized representation through selection and addition of information reflecting the selected roles to the intermediate representation.

The representation of the roles may be used, for example, to identify performance metrics (or other types of information) usable to grade and/or otherwise rank the abilities of data processing systems to perform the roles. The grades, ranking, and/or other types of quantifications of ability to perform roles may be used to provisionally select which of the data processing systems to perform various roles.

The provisional selection may then be used to propose roles that each of the data processing systems may perform. The proposals may serve as a basis for negotiation regarding which data processing systems will perform the roles.

The negotiation process may, if impasses are reached, include modifying goals and expectations associated with services to be provided to the requestors. For example, if none of the data processing systems that have been provisionally selected to perform the role agree to take on the role, then the data processing systems that have reported the ability to perform a role as a member of a may be considered for the role. If agreements can be reached, then some data processing systems may be forced to accept the proposals.

Once agreements have been reached, the data processing systems may be configured to perform the roles through a subscription based system. Once confirmed, the configured data processing systems may provide computer implemented services that are likely to meet an intent of a requestor. Refer to FIGS. 2A-2F for additional details regarding management of data processing systems to provide desired computer implemented services.

By virtue of the distributed nature of the control plane used to manage the configurations of data processing systems 111, various portions of the distributed control plane may be isolated, disconnected, and/or otherwise unable to communicate with other portions of the distributed control plane. For example, deployment manager 106 and the portion of the distributed control plane hosted by it may be unable to communicate with the portions of the distributed control plane hosted by deployment 110 if connectivity between deployment 110 and communication system 105 is limited. Such scenarios may occur, for example, in edge and/or other types of computing environments that may have more limited connectivity to core communication systems such as communication system 105.

When unable to communicate with other portions of the distributed control plane, the isolated portions of the control plane may (i) operate independently until communication is restored, (ii) use information included in the intermediate representations to establish a temporary set of rules and procedures for operation while isolated, and (iii) while out of communication, may treat all decisions as being temporary until ratified or otherwise validated by the other portions of the control plane upon restoration of communications. To establish a temporary set of rules and procedure, the intermediate representation may, in addition to defining roles for providing services, define roles for managing independent operation of the isolated portion of the control plane.

For example, the intermediate representation may define a set of roles to be performed by data processing systems of a deployment while isolated from the rest of the control plane. The roles may include, for example, (i) a leader tasked with selecting roles for data processing systems, (ii) a validator tasked with independently validating that the data processing systems that take on roles perform them in accordance with metrics that define successful performance of the roles, and (iii) a reporter tasked with independently recording information regarding the performed roles while the deployment is isolated and providing information regarding the performance of the roles once communication with the remainder of the control plane is reestablished.

By doing so, embodiments disclosed herein may provide a system that is more likely to meet the intents of requestors while providing flexibility in deployment and management. By avoiding use of rigid configurations for roles and top down management, the system may facilitate distributed management of data processing systems even while portions of the data processing systems are out of communication with portions of control planes. Accordingly, embodiments disclosed herein may provide an improved computing system that is able to provide desired services under a broader array of operating conditions that may intermittently impair functionality of the system such as communication functionality.

To provide the above noted functionality, the system of FIG. 1 may include deployment manager 106. Deployment manager 106 may (i) obtain information (e.g., intents) regarding services to be provided to clients 100 and/or finalize the intent through one or more resolution procedures, (ii) generate intermediate representations based on the obtained information regarding the intents for the clients, (iii) distribute the intermediate representations to deployment 110 for implementation, (iv) store information (e.g., subscriptions) regarding some of the data processing systems of deployment 110 used to implement the services for clients 100, and/or (v) manage the portion of the data processing systems used to provide the services to ensure that the services are provided in a manner that meet the expectations of the users of clients 100. When doing so, deployment manager 106 may operate as a member of distributed control plane that extends down to data processing systems 111.

The distributed control plane may vest decision making authority, at least in part, at different levels within the distributed control plane and modify that decision making authority responsive to changes in operable connectivity between the different levels of the distributed control plane. For example, deployment manager 106 may have authority to define an intermediate representation that data processing systems (e.g., 112-113) will implement. Other portions of the distributed control plane may have authority to decide on which roles different data processing systems will take on to provide the services on which the intermediate representation was based. Further, when isolated the other portions of the distributed control plane may automatically take on new roles to continue successful operation of the system.

For example, upon (and/or preceding) isolation, data processing systems of a deployment may automatically assign management roles and initiate independent operation. During independent operation, the data processing systems may operate based on a temporary control plane that requires a higher level of agreement or consensus. The higher degree of agreement or consensus may improve the likelihood of a successful set of configurations for data processing systems being implemented albeit at potentially lower levels of performance and/or resource efficiency.

By implementing the distributed control plane in this manner, multiple instances of deployment manager 106 may independently manage provisioning of services without needing to maintain a map (or other types of representations) of the activities of the data processing systems of any number of deployments. For example, any number of instances of deployment manager 106 may independently process service requests from clients 100 without needing to coordinate with other instances of deployment manager 106 (at least for resource management purposes). By doing so, the distributed control plane may be able to manage services for larger numbers of clients using larger numbers of data processing systems (and/or virtualized/containerized/non-physical replicas of data processing systems).

Deployment 110 may include any number of data processing systems 111 and/or other components. Deployment 110 may be implemented, for example, as a portion of data center, public or private cloud, edge system, and/or other type of computing environment. Deployment 110 may be geographically separated from deployment manager 106 and/or clients 100.

Generally, deployment 110 may implement a portion of the distributed control plane. The portion of the distributed control plane implemented by deployment 110 may be responsible for providing services by implementing intermediate representations provided by deployment manager 106 and/or other members of other portions of the distributed control plane. To do so, the portion of the distributed control plane implemented by deployment 110 may (i) obtain information based on the intermediate representation, (ii) identify members of deployment 110 that may take on roles based on the information, (iii) cooperatively decide which member of deployment 110 will take on each of the roles (and/or which group of members may take on roles in scenarios in which a role may require multiple data processing systems), (iv) configure the data processing systems based on the data processing systems elected to perform the roles through a subscription system, and (v) after configuration, initiate performance of computer implemented services.

However, when isolated from the remainder of the control plane, the portion of the distributed control plane may change its operation such that it may operate independently from the remainder of the control plane. To do so, roles defined by the intermediate representation may be implemented, and the data processing systems performing the roles may then operate the isolated deployment (e.g., through configuration of data processing systems). While operating independently, the role decisions made and implemented may be treated as temporary subject to ratification or acceptance by the rest of the control plane once communications are restored. While operating independently, the isolated portion of the control plane may typically make more conservative decisions to improve the likelihood of services being provided successfully. However, this approach may result in inefficient use of resources. Consequently, even if services are successfully provided while isolated, once reconnected to the remainder of the control plane the role assignments may be modified using a more aggressive set of decision make rules thereby improving the resource efficiency of providing services. Refer to FIGS. 2B-2F for additional details regarding deployment 110.

Figure 3A:
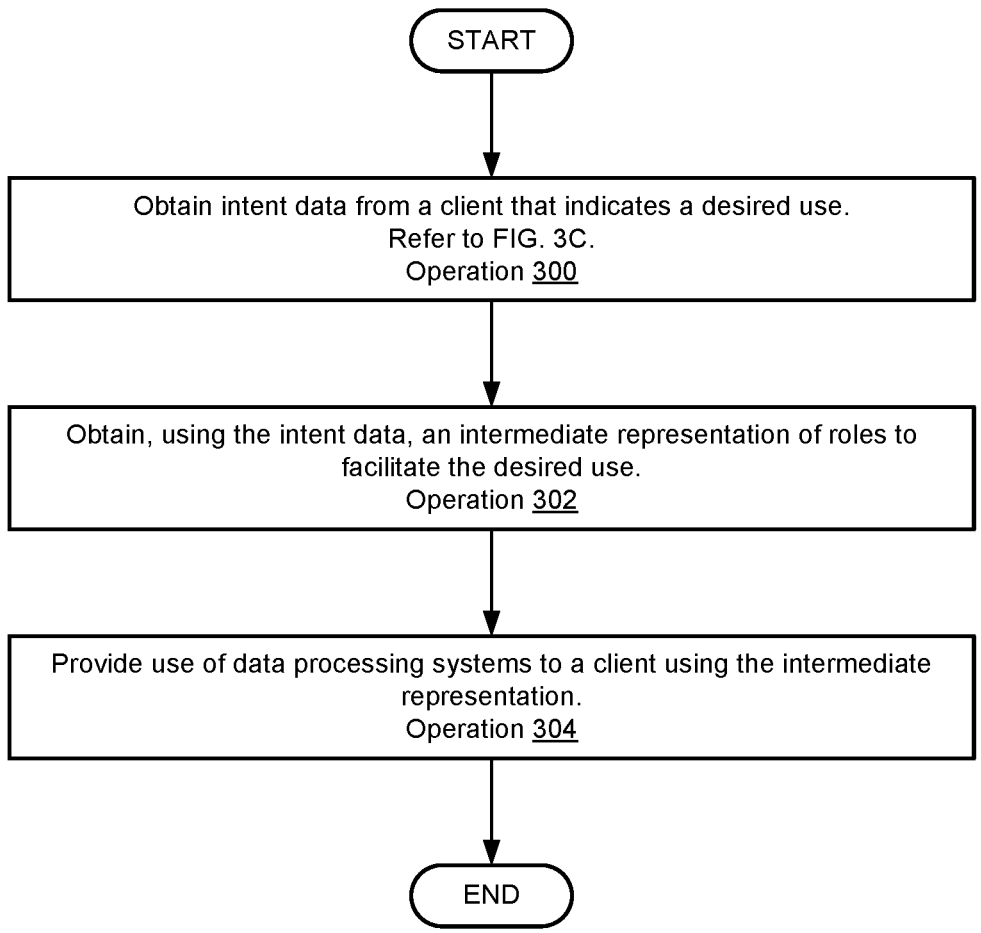
FIGS. 3A-3C show flow diagrams illustrating methods of providing computer implemented services in accordance with an embodiment.
Figure 3B:
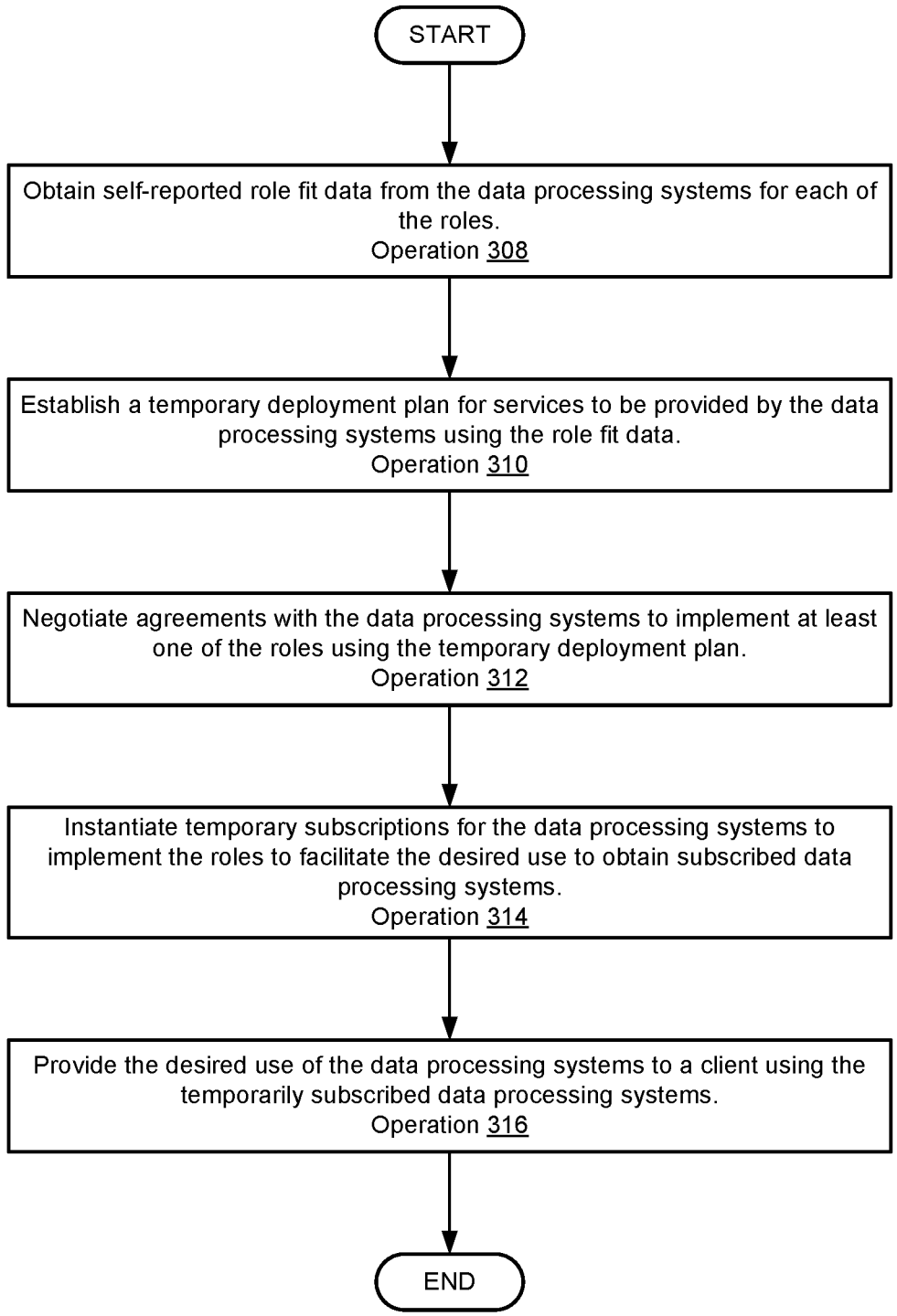
Figure 3C:
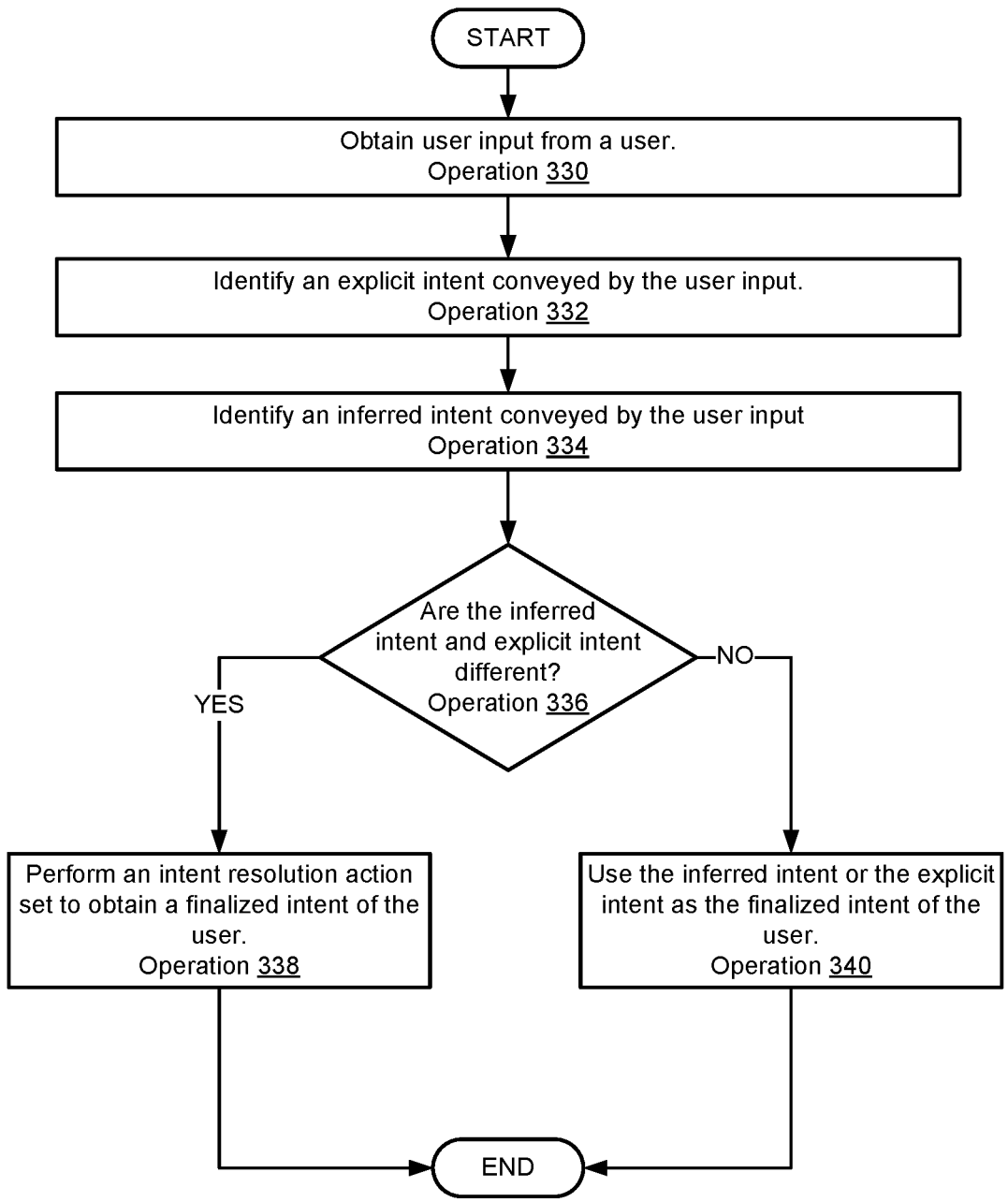

While performing their functionalities, any of clients 100, deployment manager 106, and deployment 110 may perform all, or a portion, of the methods illustrated in FIGS. 3A-3C.

Any of clients 100, deployment manager, and deployment 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), or any other type of data processing device or system. For additional details regarding computing devices, refer to FIG. 4.

Communication system 105 may include one or more networks that facilitate communication between all, or a portion, of clients 100, deployment manager 106, and deployment 110. To provide its functionality, communication system 105 may be implemented with one or more wired and/or wireless networks. Any of these networks may be private, public, and/or may include the Internet. For example, clients 100 may be operably connected to one another via a local network which is operably connected to the Internet. Similarly, deployment 110 may be operably connected to one another via a second local network which is also operably connected to the Internet thereby allowing any of clients 100 and deployment 110 to communication with one another and/or other devices operably connected to the Internet. Clients 100, deployment 110, deployment manager 106, and/or communication system 105 may be adapted to perform one or more protocols for communicating via communication system 105.

While illustrated in FIG. 1 as including a limited number of specific components, a system in accordance with an embodiment may include fewer, additional, and/or different components than those illustrated therein.

As discussed above, the system of FIG. 1 may implement a control plane that manages resources of data processing systems to provide computer implemented services. FIGS. 2A-2F show data flow diagrams in accordance with an embodiment disclosed herein. The data flow diagrams may show operation of an example system over time. For example, FIGS. 2A-2F may show flows of data and processes performed that may facilitate use of functionalities provided by deployments.

Turning to FIG. 2A, a first data flow diagram in accordance with an embodiment is shown. To initiate use of a computer implemented service, client 102 may convey an intent to deployment manager 106. The intent may be conveyed by providing information indicating one or more functionalities that the user of client 102 desires to utilize. The intent may be conveyed by, for example, presentation of one or more graphical user interfaces to the user of client 102. The graphical user interfaces may indicate the functionalities that may be provided by deployment 110. The user may select the functionalities to be provided via the graphical user interfaces, thereby conveying an intent to deployment manager 106 regarding desired functionalities.

In addition to functionalities, various limits and/or other criteria for the functionalities (e.g., referred to as "service limits") may be provided by the user. The limits may specify, for example, financial limits regarding cost for the services, the extent of the provided functionalities such as numbers of devices to which the functionalities are to be provided or rates at which the functionalities are to be provided, and/or other types of limits.

However, the information provided by client 102 may include one or more inconsistencies. For example, the information may expressly specify one intent (e.g., a desire for data storage services, through selection of data storage services from a list of services which may include other services such as rendering services) while a different intent may be inferred based on some of the selections of some of the options (e.g., selection of software for rendering via graphics processing systems which are not commonly used in conjunction with data storage services, thereby indicating a different intent for rendering services even if not explicitly specified). When a different in explicit and inferred intent is identified, a resolution process may be performed to identify a finalized intent of client 102. Refer to FIG. 3C for additional details regarding resolving differences in intent. The finalized intent may then be used to obtain intermediate representation 222 via translation process 220.

Implementing any of the functionalities may require, for example, configuration of one or more hardware components of a data processing system and deployment and/or configuration of one or more software components (e.g., a "software stack") to the data processing system for the data processing system to be able to provide, at least in part, the respective functionalities. However, the functionalities may not require specific hardware components and configurations thereof, or a specific software stack. Rather, the functionalities may be considered as being provided effectively by various hardware and software stacks, so long as various performance metrics may be met.

For example, if the functionality is to store and provide stored data, various types of storage devices and software layers for managing the stored data may all be capable of meeting the functionality of storing data and providing stored data at a particular rate. Rather than attempting to rigidly define hardware and software stacks that must be implemented to meet the intent of the user (e.g., storing and reading data at predetermined rates), an intermediate representation 222 based on the intent (i.e., the finalized intent) may be obtained.

Intermediate representation 222 may be obtained via translation process 220. Translation process 220 may take the intent from the user of client 102 and/or other types of information such as the service limits, and obtain one or more roles that, when provided, are likely to meet the intent of client 102. Intermediate representation may indicate the roles that are to be implemented based on the user's expressed intent.

The roles may be established via a lookup in a database or other process. For example, the database may include associations between functionalities, service limits, and roles. When a functionality and/or service limit is identified based on a user's expressed intent, one or more roles may be identified by performing the lookup in the database. As will be discussed in greater detail below, each of the roles may be associated with performance metrics usable to identify and/or rank data processing systems (e.g., 112-113) of deployment 110 with respect to their abilities to perform the roles.

In addition to roles for meeting the user's expressed intent, additional roles may be added to the intermediate representation. These additional roles (e.g., also referred to as "management roles") may be used to manage control of a deployment when the deployment is disconnected from deployment manager 106. The management roles added to intermediate representation 222 may include any number of roles. The management roles may be associated with the expressed user intent (e.g., much like the roles used to effectuate the user's intent, and identifiable through a lookup process).

Because different deployments may include different numbers and types of data processing systems, multiple sets of management roles and/or a set of scaling rules may be included in intermediate representation 222. If multiple sets of managements roles are included in intermediate representation 222, then each of the sets may be associated with criteria based on a deployment implementing the roles. The criteria may relate, for example, to the numbers and capabilities of data processing systems of the deployment. The criteria may indicate that sets of roles with larger numbers of management roles are to be implemented for deployments that include larger numbers of data processing systems and that sets of roles with smaller numbers of management roles are to be implemented for deployment that include smaller numbers of data processing systems. If scaling rules are included in intermediate representation 222, then the number of instances of each of the roles may be scaled based on the scaling rules. For example, the scaling rules may specify scaling factors that are based on the numbers and capabilities of data processing systems of a deployment that are implementing intermediate representation 222.

The scaling rules may also specify, for example, different systems of governance to be implemented by the management roles depending on the level of scaling. For example, as the level of scaling increases passed a threshold, the level of decision making authority vested in each data processing system may decrease. While below the threshold, the governance system may require unanimous consent of all data processing systems managed by a control plane for a decision by the control plane (e.g., by a leader thereof) to be implemented. In contrast, once above the threshold, the governance system may only require a majority (e.g., or a specific ratio) of the data processing systems managed by a control plane for a decision by the control plane (e.g., by a leader thereof) to be implemented.

Each of the management roles may be associated with a set of criteria through which data processing systems are selected for the roles. The criteria may include: (i) a minimum level of operable connectivity to other data processing systems, (ii) a quantity of available computing resources for implementing the management role, (iii) an assurance level regarding the likelihood of continued operation (e.g., such as a requirement for having a battery backup system and/or other power sources available in the event of a failure of a primary power source) of the data processing system, and/or (iv) other types of limiting criteria.

Once obtained, intermediate representation 222 may be provided to local control plane 114 of deployment 110. Local control plane 114 may be a service that manages configuration of data processing systems 112-113 to provide services. Local control plane 114 may be hosted by another device (not shown) and/or may be implemented using distributed services (e.g., hosted, in part, by each of the data processing systems).

Local control plane 114 may distribute role information for the roles defined by intermediate representation 222 to the data processing systems. The role information may include, for example, numbers and types of roles to be implemented by deployment 110, including management roles.

In a scenario in which deployment 110 is an edge deployment or other type of computing system remote to deployment manager 106, the data processing systems of deployment 110 may be operably connected to deployment manager 106 via channel 116. Channel 116 may only provide intermittent connectivity. The intermittent connectivity may, from time to time, cause deployment 110 to be communicatively isolated.

For example, channel 116 may be implemented, at least in part, with a wireless or wired communication system that be unable to carry communications from time to time (e.g., in a wireless system, environmental conditions such as weather systems may prevent data transmission during the weather; in a wired system, repeater time outs or other hardware failures may prevent data transmission until replaced). When isolated, the data processing systems of the deployment may automatically implement management roles to establish a temporary framework for independent operation.

Figure 2B:
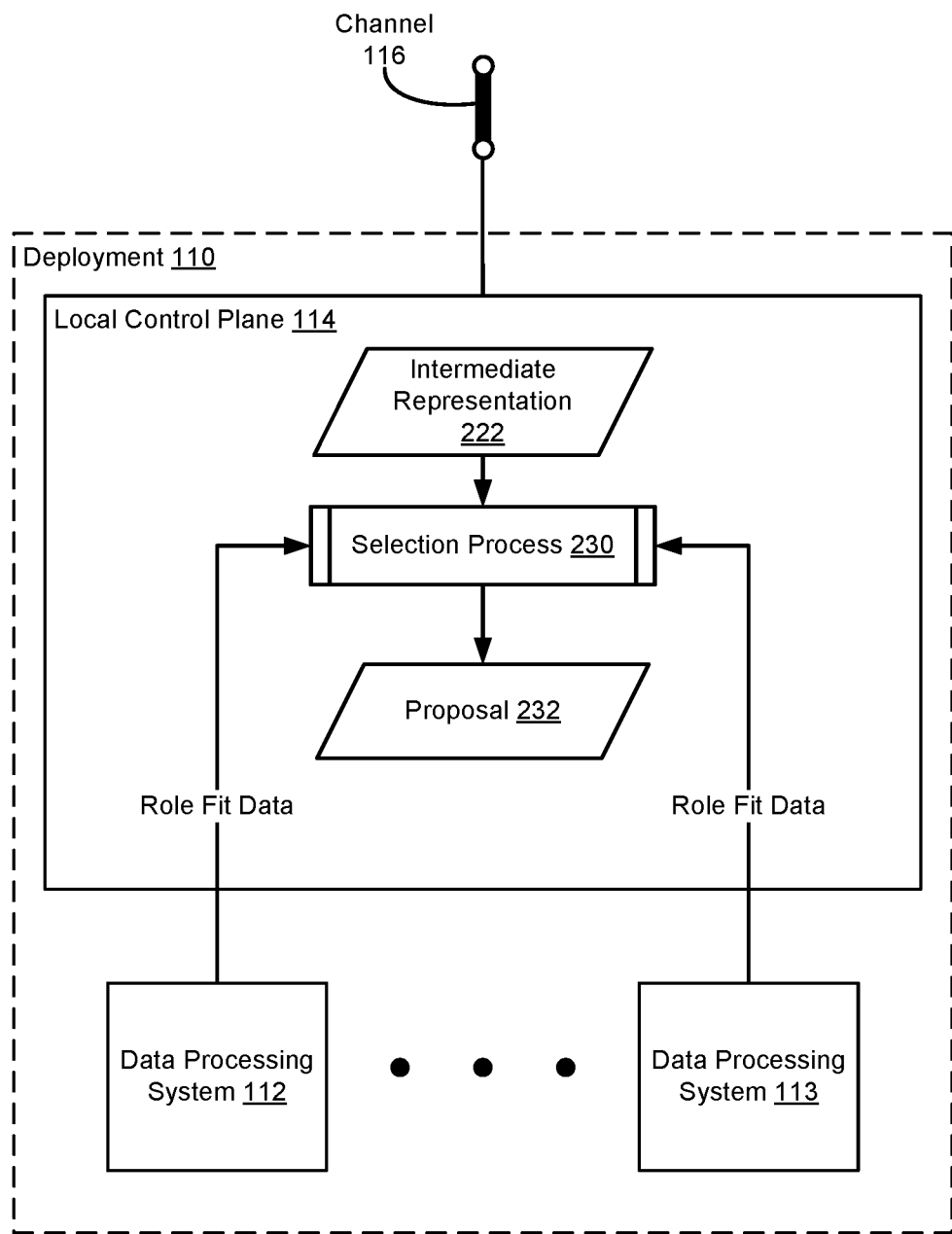

Turning to FIG. 2B, a second data flow diagram in accordance with an embodiments disclosed herein is shown. With respect to FIG. 2B, consider a scenario in which deployment 110 become isolated. In response to becoming isolated, the data processing systems of deployment 110 may perform multiple role assignment processes. During the first role assignment process, management roles may be assigned. During the second role assignment process, roles for providing services may be performed.

During both role assignment processes, each of data processing systems 112-113 may evaluate their capacities for performing the roles. To do so, data processing systems 112-113 may (i) identify hardware and/or software needed to perform the roles as well as other characteristics to meet the criteria for each role (e.g., power availability, connectivity, etc.), (ii) compare their available hardware, software, and/or other characteristics (e.g., in aggregate the "evaluation metrics") to the criteria for each role to identify their capability to perform each of the roles, (iii) rank or otherwise grade their evaluation metrics for each of the roles based on their capabilities to perform the roles, and/or (iv) provide role fit data to local control plane 114. The role fit data may indicate their self-report ability for each of the roles.

During the first phase of the role assignment process, the data processing systems may broadcast or otherwise distribute their role fit data to one another so that each data processing system may have a global view. Any type of voting process may then be implemented based on the role fit data to elect data processing systems to each of the roles.

During the second phase of the role assignment process, the data processing systems may sent their role fit data to, for example, data processing systems that have taken on management roles. Thus, in FIG. 2B and the remainder, the membership in local control plane 114 may change over time depending on whether management roles have been established. For example, prior to implementation of management roles, all of the data processing systems may be members of the local control plane while after establishment of the management roles only those data processing systems performing management roles may be part of local control plane 114.

The data processing systems may rank or otherwise grade their ability for each role using the performance metrics associated with each role. The data processing systems may evaluate their performance for each of the performance metrics (e.g., through simulation, test implementation, or other processes), and compare their performance to the given performance metrics.

For example, returning to the example for data storage services, if a performance metric indicates completion of 100 storage transactions per second, a data processing system may temporarily deploy a software stack capable of performing the storage transactions and ingest a set of test storage transactions to identify a storage transactions rate per second by the data processing system. The data processing system may then compare the tested rate to the performance metric to identify whether to what extent the data processing system is able to perform the role. For example, if the storage transaction rate of the data processing system was 120 storage transactions per second, then the data processing system may report in the role fit data that the data processing system is 120% capable of performing the role (e.g., 120/100 transactions per second). While described with respect to a single software stack, the data processing system may evaluate its performance with respect to any number of software stacks and/or hardware configurations (e.g., also referred to as "tested configurations") when evaluating its capability for performing the role. The resulting role fit data may include a report of the highest capability (for all of the tested configurations), an average capability (of the tested configurations, all of the capabilities for all of the tested configurations, limitations with respect to any of the tested configurations (e.g., whether the data processing system has sufficient free available hardware resources to support the tested configurations), and/or other information usable to appraise local control plane 114 of the capabilities of data processing systems 112-113.

While described with respect to testing for individual ability to perform roles, each of the data processing systems may also report in the role fit data their capability to perform roles in cooperation with other data processing systems. Like their individual abilities to perform roles, the distributed capability for role performance may be evaluated through cooperative testing with other data processing systems.

The resulting role fit data may indicate, for a given role, (i) a self-ranking of the ability of the data processing system to perform the role, (ii) a self-rank of the ability of a group of the data processing systems (to which the data processing system is a member) to perform the role, and/or (iii) other information reflecting the self-evaluated ability to perform a role (e.g., such as numerical quantifications with respect to different criteria for each of the roles).

Local control plane 114 may perform selection process 230 using the role fit data to obtain proposal 232. Selection process 230 may parse the role fit data to identify which of data processing systems 112-113 is best able to perform the role. Selection process 230 may include rank ordering data processing systems for the roles based on the role fit data.

The rank ordering may be based on (i) the available hardware resources of each of the data processing systems as well as other characteristics evaluated by the criteria for each of the roles, (ii) the magnitude of change to the existing hardware configurations and/or software hosted by each of the data processing systems to perform a role, (iii) the self-reported ability of each data processing system to perform the role, and/or (iv) other factors. The rank ordering may be obtained using an objective function that takes into account the above factors and outputs a numerical value. The rank ordering may be established based on the numerical values obtained from the objective function for each of the data processing systems.

For example, in the context of a management role, consider a scenario where an objective function is used that evaluates (i) a level of existing workload and (ii) a level of backup power available to a data processing system. The objective function may, for example, heavily weight the level of backup power available when compared to the weighting of the level of existing workload. Consequently, a data processing system having a large reserve of backup power may be preferentially selected over a second data processing system without battery backup even if the data processing system is already heavily loaded with existing workloads. The objective function may be used to weight and evaluate any number of criteria to obtain numerical quantifications usable to rank order data processing systems for various roles.

Proposal 232 may indicate which of data processing systems 112-113 are initially proposed (e.g., provisionally) to perform each of the roles (and/or groups of data processing systems to cooperatively perform roles, for roles that may be distributed across data processing systems). When deployment 110 is isolated, proposal 232 may be treated as a temporary proposal that may need to be subsequently ratified by other elements of the control plane once connectivity is restored.

Figure 2C:
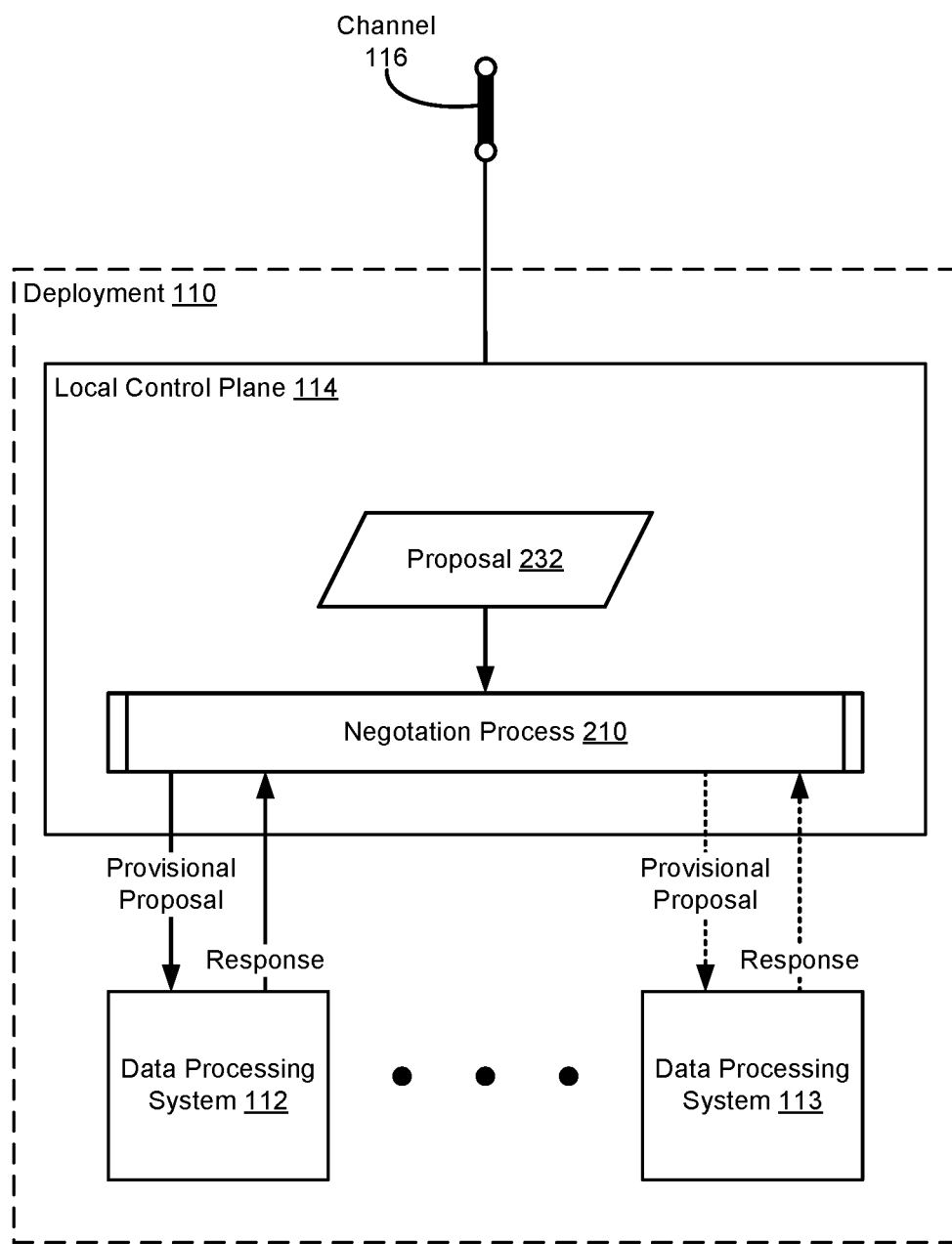

Turning to FIG. 2C, a third data flow diagram in accordance with an embodiment is shown. Using proposal 232, local control plane 114 may perform negotiation process 210 to ascertain which of data processing systems 112-113 will perform the roles.

Negotiation process 210 may be performed to confirm role assignments based on proposal 232. If proposal 232 is a temporary proposal, negotiation process 210 may use governance roles included in the intermediate representation. The governance rules may increase the level of agreement required for data processing systems to be assigned rules. For example, while deployment 110 is not isolated, a default set of governance rules may be used that may only require assent of a data processing system that will perform a role for the role to be assigned. However, when isolated, the governance rules may increase the level of assent required for a role to be assigned. Under strict governance rules, unanimous consent of all of the data processing systems may be required for a role to be assigned to a data processing system. Depending on the number of data processing systems, different levels of consent (e.g., ratio of assenting vs dissenting) may be required for roles to be assigned.

Each of data processing systems 112-113 may, upon receipt of information regarding proposal 232, evaluate and either agree or disagree with each proposed role assignment. The data processing systems may do so, for example, using information available to them that may not otherwise be available to other data processing systems.

For example, negotiation process 210 may include, for one of the roles, sending a provisional proposal to the highest rank ordered data processing systems (e.g., 112). The provisional proposal may indicate that data processing system 112 is being requested to take on the role.

The data processing system may then accept or reject the provisional proposal. To decide whether to accept or reject the proposal, the data processing system may evaluate whether it is likely to be able to successfully perform the role. The data processing system may do so by evaluating an impact on its current roles (which it is already performing) for performing the proposed role. For example, the data processing system may evaluate the computing resources necessary to perform the role based on the hardware and/or software used to estimate its capability to perform the role, discussed above, and compare the computing resources to the available computing resources. If the required computing resources exceed the available computing resources, then the data processing system may elect to reject the role. In contrast, if the required computing resources are within the available computing resources, then the data processing system may elect to take on the role.

For roles proposed to be assigned to other data processing systems, the data processing systems may evaluate the assignment based on their interactions with other data processing systems. For example, if a data processing system depends on functionality of another data processing system, the data processing system may evaluate whether the other data processing system is providing the functionality in accordance with criteria corresponding to the role performed by the other data processing system. If the performance of the function by the other data processing system does not meet the criteria, then the data processing system may cast a vote against the assignment.

Once the decision is made by a data processing system, a response may be provided to local control plane 114. If rejected based on the responses received from the data processing systems, then negotiation process 210 may continue and a new provisional proposal may be made to the next highest ranked data processing system (e.g., 113, lines to and from data processing system 113 drawn in dashed lines to indicate that the provisional and response to data processing system 113 may or may not occur, depending on whether data processing system 112 accepted, in this example).

In the event that no data processing system accepts the provisional proposals, then a remediation process may be performed for the role. The remediation process may include decreasing the performance metrics for the role, opening the role to distributed performance by multiple data processing system, etc. Additional provisional proposals may then be initiated until one or more data processing systems agrees to the role and/or the data processing systems vote to accept the role assignment.

Figure 2D:
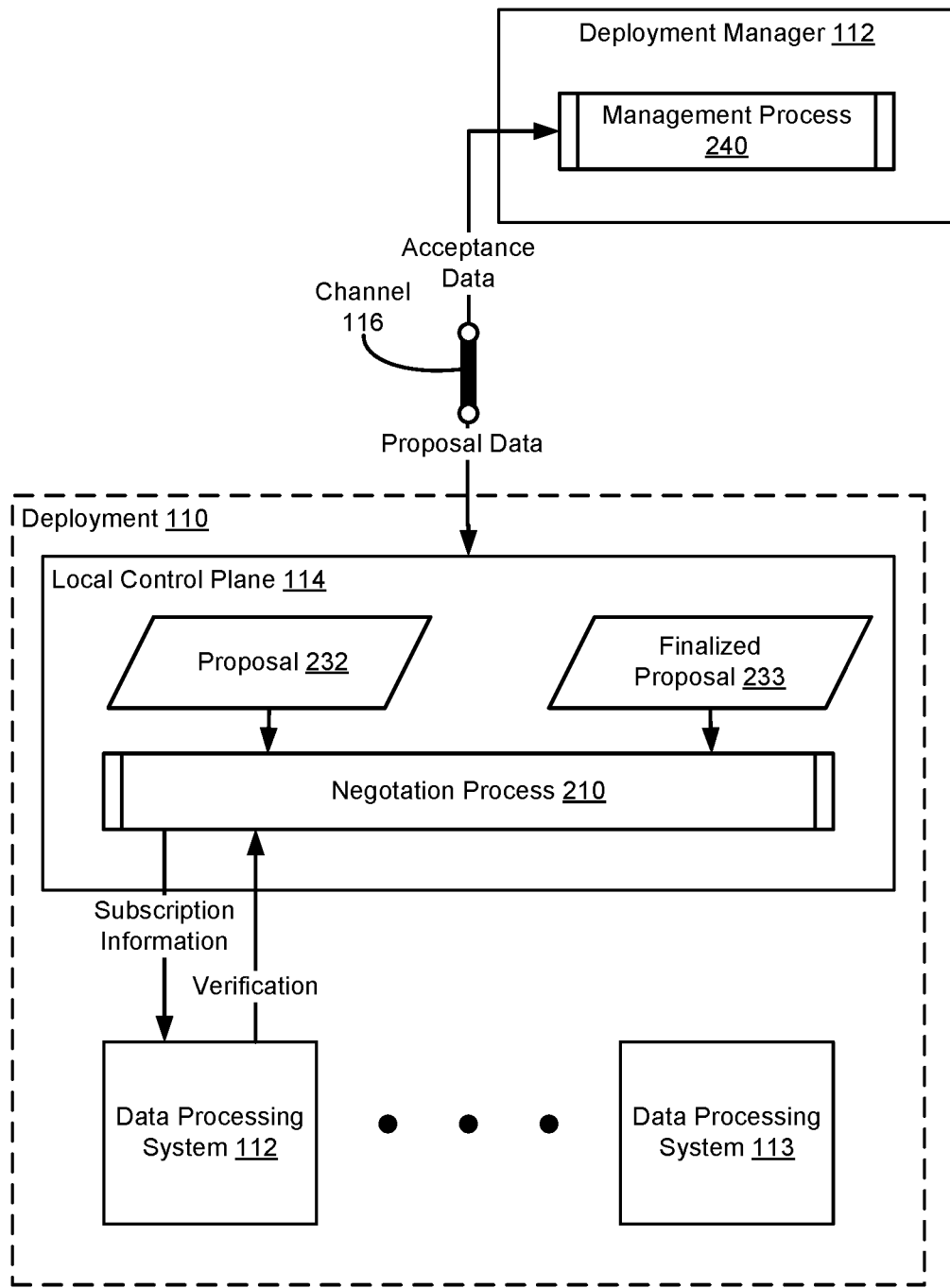

Turning to FIG. 2D, a fourth data flow diagram in accordance with an embodiment is shown. When a role assignment is made, subscription information may be transmitted to the data processing system (illustrated in FIG. 2D with respect to data processing system 112, but could be any of the data processing systems) that will implement the role. The subscription information may include information regarding when and under what conditions that the data processing system is to suspend or stop performing the role, which entities for which the role is to be performed (e.g., which client devices may utilize the services provided through the role), and/or other information usable to perform the role.

Likewise, in the context of a management role, the subscription information may include performance limits that, if not met, indicate that the data processing system is to relinquish the role (e.g., which may trigger a new negotiation process). The performance limits may include criteria like any of that discussed with respect to assignment of management roles.

Once the subscription information is received, the data processing may take action to perform the role. The actions may include, for example, any of (i) reconfiguring hardware components, (ii) deploying new software components, (iii) reconfiguring existing software components, (vi) performing verification actions, and/or (v) providing a verification to local control plane 114. The verification may indicate that the role is not yet being performed, and also include information usable to ascertain whether the role is being performed within the performance metrics for the role. For example, the verification actions may include performing testing to ascertain the data processing system's performance levels with respect to the performance metrics for the role.

Figure 2E:
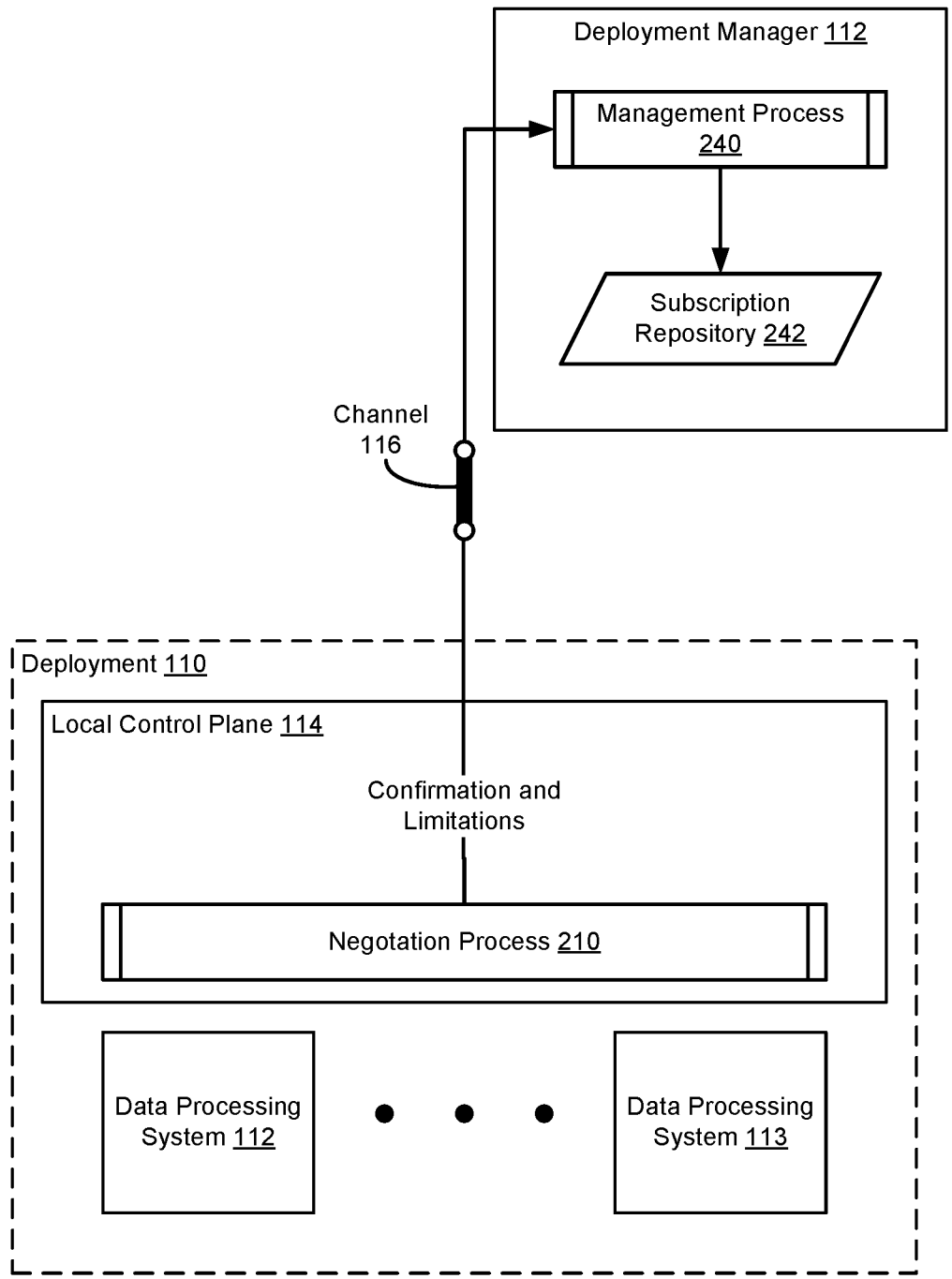

Turning to FIG. 2E, a fifth data flow diagram in accordance with an embodiment is shown. Once communication with other portions of the control plane are restored, the temporary proposal and implementation may be validated, verified, and/or modified (if validation fails or efficiency gains may be obtained through role reassignment).

Based on a verification from a data processing system, negotiation process 210 may provide a confirmation regarding the role as well as any limitations for the role to deployment manager 106. For example, deployment manager 106 may perform a management process 240 that manages the functionalities requested by users of the clients. Management process 240 may process the confirmation and limitations to quantify whether a functionality is being provided in a manner consistent with a requestor of the functionality.

For example, management process 240 may maintain subscription repository 242. Subscription repository 242 may include information regarding the functionalities requested (e.g., subscribed to) by users of the clients. For a given functionality, management process 240 may track the confirmations and limitations from deployment 110. Management process 240 may compare, based on the confirmations and limitations, the extent to which a particular functionality is being provided to a user. Once the functionality meets metrics (e.g., when all of the roles of an intermediate representation corresponding to the function), then subscription repository 242 may be updated to reflect that a subscription for the functionality is now being satisfied.

Similarly, the roles assigned while deployment 110 is isolated may be re-evaluated to ascertain whether some degree of efficiency may be obtained through role reassignment. An intermediate representation may include different sets of roles to be implemented under different operating conditions. For example, while isolated one set of roles may be implemented. These roles may generally include evaluation criteria that is more conservative thereby improving the likelihood of a data processing system that meets the criteria also successfully performing the role. In contrast, while not isolated another set of roles may be implemented. The roles from the other set may generally include evaluation criteria that is more aggressive thereby potentially increasing computing resource use efficiency while incurrent more risk with respect the to-be-provided services. However, because the full control plane may have a view into the operation of deployment 110, the increased level of risk may be acceptable (e.g., the full control plane may be able to take additional remedial action that deployment 110 may not be able to take to address any shortcomings in the provided services).

Once a subscription is satisfied, then the use and performance of the functionality may be tracked to (i) confirm that the subscription for the functionality continues to be satisfied and (ii) identify whether any limits on the subscription (e.g., number of concurrent users, number of uses, duration of subscription, etc.) are exceeded. If any of the limits are exceeded, then management process 240 may confirm whether the data processing systems performing the roles for the subscription for the functionality have discontinued performing or otherwise modified their performance to limit the use of the subscription to be within the subscription limitations. Management process 240 may take action to modify the operation of the data processing systems if the data processing systems are exceeding the subscribed to level of the functionalities.

Figure 2F:
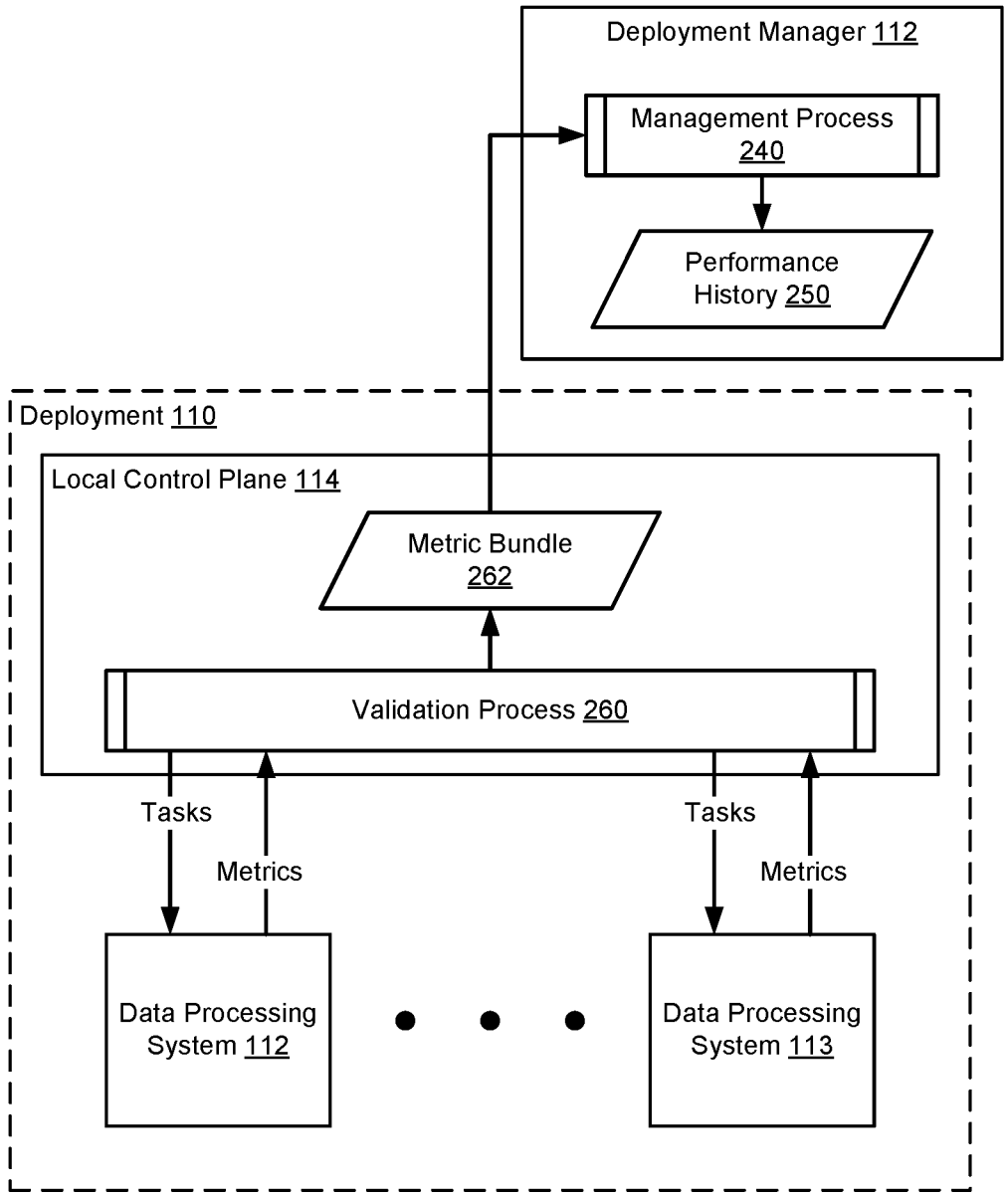

Turning to FIG. 2F, a sixth data flow diagram in accordance with an embodiment is shown. To identify whether any subscription limits have been exceeded, local control plane 114 may implement validation process 260. Validation process 260 may assign data collection tasks to data processing systems 112-113. The tasks may include monitoring performance of the roles assigned to data processing systems 112-113 to ascertain whether any of the subscription limitations have been exceeded. For example, the tasks may include monitoring of the computing resources consumed for performing the roles, the number of clients serviced by the roles, and/or other data collection processes to obtain metrics usable to ascertain whether subscription limitations have been exceeded.

The metrics may be collected by local control plane 114, aggregated, and provided to deployment manager 106 as metric bundle 262. Management process 240 may use metric bundle 262 to establish performance history 250. Performance history 250 may quantify the extent of use of the data processing systems for providing a functionality, the extent of use of the functionality by other devices, and/or otherwise establish a basis for ascertaining whether subscription limits have been exceeded and performance goals for a functionality are met.

Any of the processes described with respect to FIGS. 2A-2F may be implemented using any combination of software components (e.g., processes executing using computer processors) and/or non-programmable hardware components that include circuitry adapted to provide all, or a portion, of the functionality of the processes.

As discussed above, the components of FIG. 1 may perform various methods to manage a deployment. FIGS. 3A-3C illustrate examples of methods that may be performed by the components of FIG. 1. In the diagrams discussed below and shown in FIGS. 3A-3C, any of the operations may be repeated, performed in different orders, and/or performed in parallel with or a partially overlapping in time manner with other operations.

Turning to FIG. 3A, a flow diagram illustrating a method of providing computer implemented service in accordance with an embodiment is shown. The method may be performed by a data processing system, a deployment manager, a client, and/or another component (e.g., not shown in FIG. 1).

At operation 300, intent data from a client that indicates a desired use is obtained. The desired use may be to receive a functionality of a deployment. The functionality may be provided through computer implemented services used by the client and provided by the deployment.

The intent data may be obtained from the client by (i) displaying a graphical user interface to the client that shows the available functionalities of the deployment, and (ii) receiving, via the graphical user interface, one or more user inputs indicating the intent from the client. The user inputs may be obtained, for example, by the user clicking on active elements (e.g., widgets, input boxes, etc.) of the graphical user interface. The input may indicate the functionalities to be provided, capacities and/or other characterizations regarding an extent of desired use of the functionalities, duration based and/or other types of limitations regarding the desired use, and/or other information indicating an intent of a user of the client. While described with respect to a graphical user interface, the intent of the client may be obtained via other methods without departing from embodiments disclosed herein.

However, when information reflecting the intent of the client is obtained, the information may be contradictory. For example, the information (e.g., user input) may expressly indicate one intent, but may include information that suggest a different intent (e.g., one that may be inferred). In the event that contradictory information is present indicating a different between an expressed and an inferred intent, then a resolution process may be performed to finalize the intent. Refer to FIG. 3C for additional details regarding finalizing intents.

At operation 302, an intermediate representation of roles to facilitate the desired use is obtained using the intent data (e.g., the finalized intent if a difference between intents was present). The intermediate representation may be obtained by (i) translating the intent data into a portion of roles for the intermediate representation, (ii) establishing one or more management roles for the intermediate representation, and/or (iii) adding information regarding governance rules to the intermediate representation.

For example, to establish the portion for the roes based on the intent data, the intent data may serve as one or more keys usable to perform a lookup in a data structure that associates the keys with roles and/or role identifiers. The intermediate representation may be obtained using the roles and/or role identifiers. For example, information regarding the roles and/or the role identifiers may be aggregated into a data structure (e.g., the intermediate representation). The lookup may return different sets of roles to be implemented when a deployment is isolated and when a deployment is not isolated. The resulting portion of roles may include these different sets of roles.

Similarly, the portion of the roles may serve as one or more keys usable to perform a lookup in a data structure that associates the portion of the roles with one or more management roles and/or management identifiers. The intermediate representation may be obtained using the management roles and/or management role identifiers. For example, information regarding the management roles and/or the management role identifiers may be aggregated into the data structure (e.g., the intermediate representation).

The governance rules may, like the management roles, may be identified by performing a lookup in a data structure that associates the management roles with various sets of governance rules to be used under different operating conditions (e.g., based on the numbers and capabilities of data processing systems). Information regarding the governance rules identified via the lookup may be aggregated into a data structure (e.g., the intermediate representation).

While described with a respect to a lookup, the process for identifying the roles, management roles, and governance rules may be other types of identification procedures (e.g., other than lookups) without departing from embodiments disclosed herein.

At operation 304, use of data processing systems is provided to a client using the intermediate representation. The use may be provided by deploying roles indicated by the intermediate representation to the data processing systems. Once deployed, the data processing systems may provide one or more services consistent with the desired use of the client.

To deploy the roles, a leader may be selected using the intermediate representation. The leader may be selected by: (i) distributing information regarding criteria to be the leader to data processing systems of a deployment, (ii) obtaining self-reported roll fit data for the leader based on the criteria, (iii) ranking the data processing systems based on the self-reported roll fit data, and (iv) selecting the leader based on the ranking. Other management roles may be assigned using similar processes. During assignment of the management roles, governance rules from the intermediate representation may be enforced.

Once the management roles are deployed, then other roles to provide the desired use may be assigned. The other roles may be assigned via the method illustrated in FIG. 3B.

The method may end following operation 304.

Using the method illustrated in FIG. 3A, intent from a client may be used to obtain an intermediate representation for roles to provide a desired use of data processing systems. The intermediate representation may provide flexibility in implementation and control thereby improving the likelihood of the desired use being provided successfully, even under challenging conditions.

Turning to FIG. 3B, a flow diagram illustrating a method of providing computer implemented service in accordance with an embodiment is shown. The method may be performed by a data processing system, a deployment manager, a client, and/or another component (e.g., not shown in FIG. 1). The flow diagram shown in FIG. 3B may be an expansion of operation 304 shown in FIG. 3A.

At operation 308, self-reported role fit data is obtained from each of the data processing systems for each of the roles. The self-reported role fit data may (i) indicate estimates of the ability of each data processing system to fulfill each of the roles and/or (ii) include other information reflecting how adoption of the role may be implemented by a data processing system. The self-reported role fit data may be obtained by receiving it or otherwise obtaining it from the data processing systems. The local control plane (e.g., a leader) may aggregate the information.

For example, information regarding the roles may be provided to the data processing systems (e.g., such as a listing of the roles), the data processing systems may self-evaluate their abilities to perform the roles to the leader and/or other members of the local control plane, and the data processing systems may self-report their role fit data based on their self-evaluation of the abilities to perform the roles.

The self-reported role fit data may only include information for a subset of the roles indicated by the intermediate representation. For example, while isolated the data processing systems of the deployment may only report role-fit data for roles to be implemented while the deployment is isolated.

At operation 310, a temporary deployment plan for services to be provided by the data processing systems is established based on the self-reported role fit data. The temporary deployment plan may be obtained by rank-ordering the data processing systems based on their self-reported role fit data for each role. The rank ordering may be obtained by (i) rank ordering based on the estimated abilities to perform each of the roles to obtain an initial rank ordering and (ii) selection of data processing systems for the roles based on the rank ordering. For example, the highest ranked data processing system for each role may be selected to provide the services associated with each of the roles.

At operation 312, agreements with the data processing systems to implement at least one of the roles is negotiated using the temporary deployment plan. The agreements may be negotiated by, for a role, generating and sending a provisional proposal to the best ranked data processing system, and receiving a response based on the provisional proposal. Depending on the governance rules in place, the provisional proposal may also be sent out to other data processing systems which may similarly respond regarding assignment of the role to the data processing system If the responses are affirmative to a degree required by the governance rules, then an agreement may be reached and the data processing system may be selected for the role. If the response is negative, then a similar process may be performed with respect to the next highest ranked data processing system. This process may continue until a data processing system respond is selected for the role, or no data processing system is selected.

If no data processing system is selected, then the quality metrics for the role may be adjusted (e.g., by reducing them), and/or the process may be repeated with the adjusted metrics. The quality metrics may be lowered via the adjustment thereby allowing a data processing system that does not meet the quality metrics to agree to take on the role and a level of agreement of the other data processing system obtained that meets the standards set forth in the governance rules.

If no data processing system is selected, then the aforementioned process may be repeated, but for distributed implementations of the role where multiple data processing systems may provide the roles.

At operation 314, temporary subscriptions for the data processing systems are instantiated to implement the roles to facilitate the desired use to obtain subscribed data processing systems. The subscriptions may be instantiated by, for example, (i) verifying that the data processing systems that have agreed to the roles have implemented any software and/or hardware changes to take on the role (e.g., using the software and/or hardware configurations through which the self-evaluations with respect to the ability each of each data processing system to perform the roles), (ii) validating the extent to which the data processing systems actually perform the services associated with each of the roles, (iii) when satisfactorily evaluated, deploying subscription information to the data processing systems, the subscription information may provide criteria through which the data processing systems evaluate whether subscription limitations have been exceeded, and/or (iv) recording the subscriptions as being serviced in management systems.

At operation 316, the desired use of the data processing systems is provided to the client using the temporarily subscribed data processing systems. The desired use may be provided through the operation of the temporarily subscribed data processing systems.

The method may end following operation 316.

Following operation 316, connectivity may be restored to other portions of the control plane. As discussed above, once restored, the local control plane of the deployment may provide information regarding the temporary subscriptions and role assignments to the other portions of the control plane. The other portions of the control plane may then ratify the subscriptions and role assignments, or initiate a reassignment and resubscription process.

Turning to FIG. 3C, a flow diagram illustrating a method of resolving differences between expressed and inferred intent in accordance with an embodiment is shown. The method may be performed by a data processing system, a deployment manager, a client, and/or another component (e.g., not shown in FIG. 1). The flow diagram shown in FIG. 3C may be an expansion of operation 300 shown in FIG. 3A.

At operation 330, intent from a user (e.g., a representative of the client discussed with respect to operation 300) is obtained. The intent may be obtained by receiving information reflecting the intent. For example, as noted above, a graphical user interface may present selectable active elements to the user. The user may select elements to communicate an intent for services to be provided to the client.

In an embodiment, the graphic user interface includes a frame that displays information to the user. The information may include (i) prompts designed to elicit an expression of intent and (ii) prompts to confirm the expressed intent. For example, the prompts to confirm the expressed intent may present options that, if selected by the user, lead to an inference of the user having a different intent (i.e., a different inferred intent.

For example, a first prompt may provide options for selecting types of services to be provided thereby inducing the user to express an intent. The types of services may include high level service offers such as, for example, data storage product names, file sharing product names, software platform product names, etc. In contrast, other prompts designed to confirm the expressed intent may not explicitly identify intent associated with responses to the other prompts. The other prompts may include options that would be inconsistent with the expressed intent. For example, if the expressed intent is a data storage product name (e.g., expressing an intent for data storage), the other prompts may provide storage space ranges. Some of the storage space ranges may be appropriate for the data storage product while others may not be appropriate. If the user selects one of the inappropriate storage space ranges responsive to these other prompts, then the selection may be used to infer an intent that is different from the expressed intent.

At operation 332, an explicit intent conveyed by the user input is identified. The explicit intent may be identified by performing a lookup based on a response to a first set of prompts, discussed above. The lookup may return a classification for the explicit intent.

At operation 334, an inferred intent conveyed by the user input is identified. The inferred intent may be identified by performing a lookup based on a response to a second set of prompts, discussed above. The lookup may return a classification for the inferred intent.

A user input conveying a response to one of the second set of prompts may be associated with multiple intent classifications. For example, if a user provides user input indicating a preference for a certain amount of storage space, this amount of storage space may be associated with a number of different types of express intents regarding services to be provided to the client. Thus, a lookup in a data structure may return multiple inferred intents (e.g., such as an inferred intent for data storage services, and an inferred intent for database services, which both may commonly use storage space in the range of the amount indicated by the user input). Lookups for expressed intents may similarly return multiple expressed intents.

At operation 336, a determination is made regarding whether the inferred intent and the expressed intent are different. The determination may be made by comparing the classifications for the intents obtained in operations 332-334. In a scenario in which multiple intents were identified based on some of the user input obtained in operation 330, another intent based on some other user input obtained in operation 330 may be considered to not be different if the other intent matches any of the multiple intents.

In a scenario in which multiple express or inferred intents are obtained that are different (e.g., based on multiple user inputs that all are associated with expressed or inferred intents), then other intents (e.g., inferred if multiple expressed intents are obtained) may be considered to not be different if any of the other intents match any of the multiple intents. For example, if two expressed intents are obtained that have different classifications, then inferred intents for either of the different classifications may be considered not be different.

In a scenario in which a number of the expressed or inferred intents exceed a threshold, the number may be reduced to be below the threshold. The number may be reduced by purging some of the number. The purged members of the number of intents may be selected based on the numbers of each intent classification in the number. For example, members of a minority intent classification may be preferentially purge. The purging process may homogenize the express or inferred intents with respect to intent classification.

If it is determined that the inferred intent and the explicit intent are different, then the method may proceed to operation 338. Otherwise the method may proceed to operation 340.

At operation 338, an intent resolution action set is performed to obtain a finalized intent for the user. The intent resolution action set may be performed by perform one or more actions that may resolve the difference between the inferred intent and the explicit intent.

In an embodiment, an action of the actions set obtains additional information from the user. The additional information may be obtained, for example, through a graphical user interface, through use of an agent that monitors certain behaviors, and/or via other methods.

In an embodiment, the action includes obtaining user input indicating a response to a question based on a difference between the expressed an inferred intent. The user input may be obtained by (i) generating one or more questions based on the difference, (ii) presenting the question to the user via a graphical user interface, and (iii) obtaining user feedback responsive to the question via the graphical user interface.

The one or more questions may be generated based on the difference. For example, a question template may be obtained via a lookup in a data structure that associates different questions with different intent classifications. The classifications for the express and inferred intents may be used as keys to lookup the question. The difference may be used to finalize the question. The question may include one or more replaceable fields which the difference may replace. Multiple questions may be obtained via this lookup process.

For example, the question may indicate information regarding a use case, and the difference may be numbers of users associated with the classifications of the expressed and inferred intents. The resulting question may request that the user provide an estimate for the number of users with a range defined by the difference.

In an embodiment, the action includes obtaining user input indicating a response to presentation of a simulated environment based on the explicit and the inferred intent. The user input may be obtained via a graphical user interface through which the simulated environment is presented to the user. The simulated environment may allow the user to experience the services that are likely to be provided as best interpreted by the inferred and the expressed intent. The graphical user interface may include questions or prompts for the user input that reflect how the computing environment would behavior if the environment operated more consistently with the expressed intent or the inferred intent.

Presenting the simulated environment may include (i) generating, based on the explicit intent and the inferred intent, a second intermediate representation (e.g., based on the inferred and expressed intent); (ii) instantiating, using the second intermediate representation and the data processing systems, a temporary computing environment; (iii) presenting, to the user or the second user, the temporary computing environment via the graphical user interface; and (iv) obtaining the user input via the graphical user interface.

The second intermediate representation may be based on the respective intents. For example, the explicit intent may indicate a first quantity of computing resources (e.g., storage space), the inferred intent may indicate a second quantity of computing resources (e.g., storage space), and the intermediate representation may implicate deployment of a quantity of computing resources between the first quantity of computing resources and the second quantity of computing resources. Through interaction with the temporary computing environment, the user may appreciate how this quantity of resources impacts the quality of the services that will be provided if no changes are made. This may prompt the user to provide user feedback representing desired changes. This user feedback may be used to finalize the intent upon which an intermediate representation will be generated.

In an embodiment, the action includes obtaining a data package indicating use of a computing environment by the user. The data package may be obtained by (i) identifying a metric based at least in part on the difference; (ii) instantiating an agent (or using an existin agent) in the computing environment, the computing environment being used by the client to receive computer implemented services; (iii) monitoring, using the agent, the metric with respect to the computer implemented services; and (iv) obtaining the data package based on the monitoring of the metric. For example, the metric may be a quantity of storage input-output rate. The agent may be a monitoring application that monitors the input-output rate of the storage of the computing environment over a period of time, and reports the average rate over the time period.

The data package may be used, for example, to scale the inferred and/or explicit intent to obtain the finalized intent; and/or scale the numbers of roles which will be added to an intermediate representation based on the finalized intent. For example, the translation process may presume, based on an intent, a predetermined number of roles and a predetermined use rate for computing resources. If the monitored rate indicated by the metric differs from that the predetermined use rate, then the number of instances of the roles added to the intermediate representation may be proportionally scaled based on the actual and presumed rate of use of the computing resources.

The action set may include any number of the above noted actions. Thus, the finalized intent may be modified based on multiple user inputs and data packages.

The method may end following operation 338.

Returning to operation 336, the method may proceed to operation 340 following operation 336 when the inferred intent and the explicit intent are not different.

At operation 340, either the inferred intent or the explicit intent is used as the finalized intent (e.g., since they do not differ from one another).

The method may end following operation 340.

Using the methods illustrated in FIGS. 3A-3C, embodiments disclosed herein may provide a distributed system that is better able to provide desired services at a lower computational overhead when compared to systems that use rigid central management modalities and/or fixed configurations for systems to provide services. Additionally, to improve the likelihood of the services provided to clients being desirable, the system may automatically attempt to identify differences between expressed and inferred intents. If differences exist, resolution processes may be automatically performed to finalize intent of the client.

Figure 4:
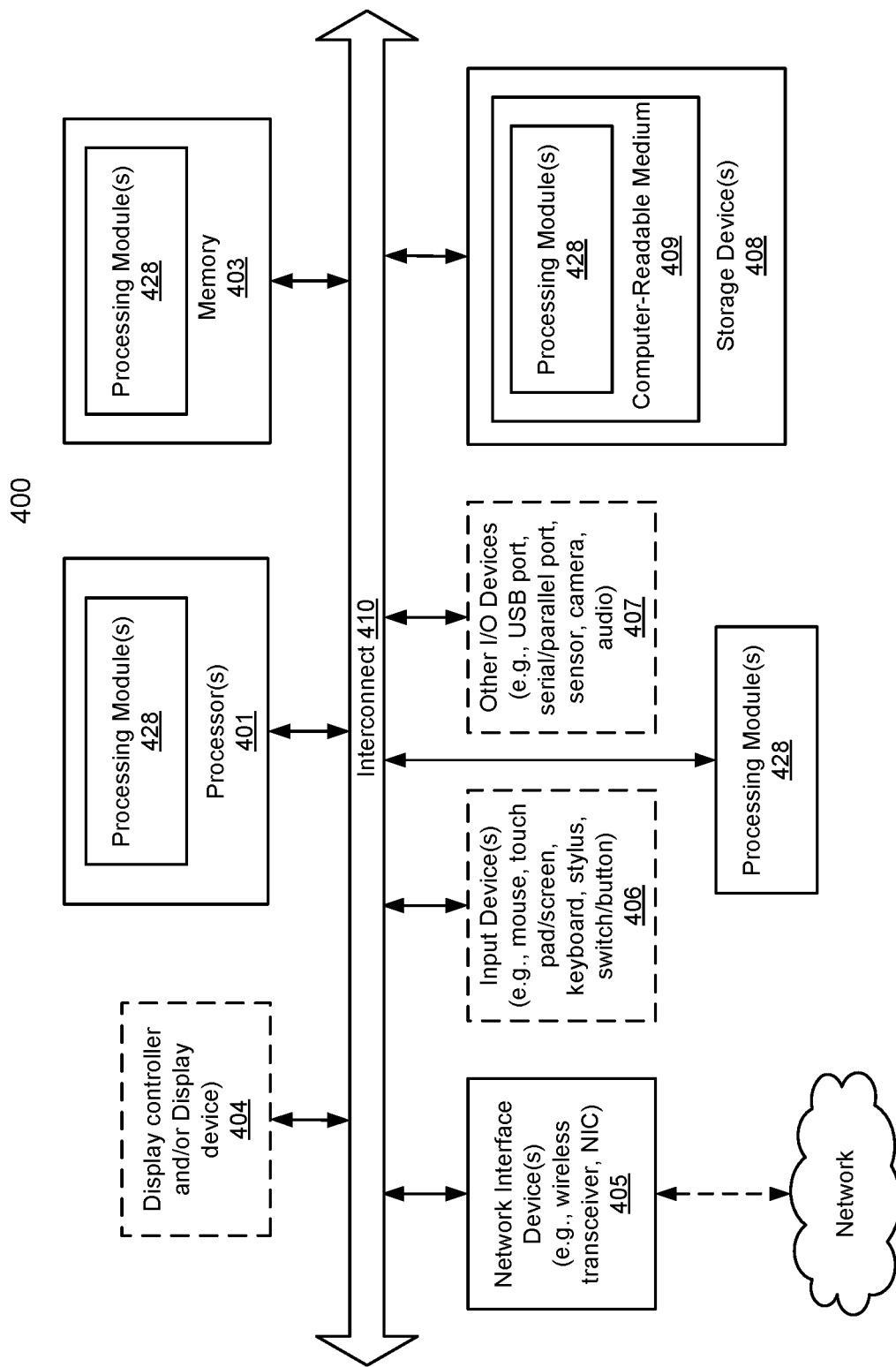
FIG. 4 shows a block diagram illustrating a data processing system in accordance with an embodiment.

Any of the components illustrated in FIGS. 1-2F may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS/iOS® from Apple, Android® from Google®, Linux®, Unix®, or other real-time or embedded operating systems such as VxWorks.

System 400 may further include 10 devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing services provided using data processing systems, the method comprising:
    obtaining, using a graphical user interface, user input from a user, the user input including information regarding a service of the services to be provided using the data processing systems;
    identifying an explicit intent conveyed by the user input;
    identifying an inferred intent conveyed by the user input;
    making a determination regarding whether the explicit intent and the inferred intent are different;
    in an instance of the determination where the explicit intent and the inferred intent are different:
        initiating performance of an intent resolution action set to obtain a finalized intent for the user, the intent resolution action set comprising at least one action selected from a group of actions consisting of:
            obtaining second user input indicating a response to a question based on the difference,
            obtaining third user input indicating a response to presentation of a simulated environment based on the explicit intent and the inferred intent, and
            obtaining a data package indicating use of a computing environment by the user;
        obtaining an intermediate representation based on the finalized intent; and
        providing use of the data processing systems to a client using the intermediate representation.

2. The computer-implemented method of claim 1, wherein obtaining the second user input indicating the response to the question based on the difference comprises:
    obtaining the question based at least in part on the difference;
    presenting the question to the user or a second user via a second graphical user interface; and
    obtaining the second user input via the second graphical user interface,
    wherein the user and the second user are representatives of the client.

3. The computer-implemented method of claim 2, wherein obtaining the third user input indicating the response to the presentation of the simulated environment based on the explicit intent and the inferred intent comprises:
    generating, based on the explicit intent and the inferred intent, a second intermediate representation;
    instantiating, using the second intermediate representation and the data processing systems, a temporary computing environment;
    presenting, to the user or the second user, the temporary computing environment;
    obtaining the third user input via a third graphical user interface, the third user input being provided by the user or the second user responsive to the presentation of the temporary computing environment.

4. The computer-implemented method of claim 3, wherein the explicit intent indicates a first quantity of computing resources, the inferred intent indicates a second quantity of computing resources, and the intermediate representation implicates deployment of a quantity of computing resources between the first quantity of computing resources and the second quantity of computing resources.

5. The computer-implemented method of claim 4, wherein the third user input indicates a quality rating of computer implemented services provided by the temporary computing environment.

6. The computer-implemented method of claim 5, wherein obtaining the data package indicating use of the computing environment by the user comprises:
    identifying a metric based at least in part on the difference;
    instantiating an agent in the computing environment, the computing environment being used by the client to receive computer implemented services;
    monitoring, using the agent, the metric with respect to the computer implemented services; and
    obtaining the data package based on the monitoring of the metric.

7. The computer-implemented method of claim 6, wherein in an instance of the intent resolution action set that comprises the obtaining of the data package, the intent resolution action set further comprises:
    scaling a number of instances of roles of the intermediate representation based on the data package and a threshold.

8. A non-transitory machine-readable medium having instructions stored therein, which when executed by a processor, cause the processor to perform operations for managing services provided using data processing systems, the operations comprising:
    obtaining, using a graphical user interface, user input from a user, the user input including information regarding a service of the services to be provided using the data processing systems;
    identifying an explicit intent conveyed by the user input;
    identifying an inferred intent conveyed by the user input;
    making a determination regarding whether the explicit intent and the inferred intent are different;
    in an instance of the determination where the explicit intent and the inferred intent are different:
        initiating performance of an intent resolution action set to obtain a finalized intent for the user, the intent resolution action set comprising at least one action selected from a group of actions consisting of:
            obtaining second user input indicating a response to a question based on the difference,
            obtaining third user input indicating a response to presentation of a simulated environment based on the explicit intent and the inferred intent, and
            obtaining a data package indicating use of a computing environment by the user;
        obtaining an intermediate representation based on the finalized intent; and
        providing use of the data processing systems to a client using the intermediate representation.

9. The non-transitory machine-readable medium of claim 8, wherein obtaining the second user input indicating the response to the question based on the difference comprises:
    obtaining the question based at least in part on the difference;
    presenting the question to the user or a second user via a second graphical user interface; and
    obtaining the second user input via the second graphical user interface,
    wherein the user and the second user are representatives of the client.

10. The non-transitory machine-readable medium of claim 9, wherein obtaining the third user input indicating the response to the presentation of the simulated environment based on the explicit intent and the inferred intent comprises:
generating, based on the explicit intent and the inferred intent, a second intermediate representation;
instantiating, using the second intermediate representation and the data processing systems, a temporary computing environment;
presenting, to the user or the second user, the temporary computing environment;
obtaining the third user input via a third graphical user interface, the third user input being provided by the user or the second user responsive to the presentation of the temporary computing environment.

11. The non-transitory machine-readable medium of claim 10, wherein the explicit intent indicates a first quantity of computing resources, the inferred intent indicates a second quantity of computing resources, and the intermediate representation implicates deployment of a quantity of computing resources between the first quantity of computing resources and the second quantity of computing resources.

12. The non-transitory machine-readable medium of claim 11, wherein the third user input indicates a quality rating of computer implemented services provided by the temporary computing environment.

13. The non-transitory machine-readable medium of claim 12, wherein obtaining the data package indicating use of the computing environment by the user comprises:
identifying a metric based at least in part on the difference;
instantiating an agent in the computing environment, the computing environment being used by the client to receive computer implemented services;
monitoring, using the agent, the metric with respect to the computer implemented services; and
obtaining the data package based on the monitoring of the metric.

14. The non-transitory machine-readable medium of claim 13, wherein in an instance of the intent resolution action set that comprises the obtaining of the data package, the intent resolution action set further comprises:
scaling a number of instances of roles of the intermediate representation based on the data package and a threshold.

15. A data processing system, comprising:
a processor; and
a memory coupled to the processor to store instructions, which when executed by the processor, cause the processor to perform operations for managing services provided using data processing systems comprising the data processing system,
the operations comprising:
obtaining, using a graphical user interface, user input from a user, the user input including information regarding a service of the services to be provided using the data processing systems;
identifying an explicit intent conveyed by the user input;
identifying an inferred intent conveyed by the user input;
making a determination regarding whether the explicit intent and the inferred intent are different;
in an instance of the determination where the explicit intent and the inferred intent are different:
initiating performance of an intent resolution action set to obtain a finalized intent for the user, the intent resolution action set comprising at least one action selected from a group of actions consisting of:
obtaining second user input indicating a response to a question based on the difference,
obtaining third user input indicating a response to presentation of a simulated environment based on the explicit intent and the inferred intent, and
obtaining a data package indicating use of a computing environment by the user;
obtaining an intermediate representation based on the finalized intent; and
providing use of the data processing systems to a client using the intermediate representation.

16. The data processing system of claim 15, wherein obtaining the second user input indicating the response to the question based on the difference comprises:
obtaining the question based at least in part on the difference;
presenting the question to the user or a second user via a second graphical user interface; and
obtaining the second user input via the second graphical user interface,
wherein the user and the second user are representatives of the client.

17. The data processing system of claim 16, wherein obtaining the third user input indicating the response to the presentation of the simulated environment based on the explicit intent and the inferred intent comprises:
generating, based on the explicit intent and the inferred intent, a second intermediate representation;
instantiating, using the second intermediate representation and the data processing systems, a temporary computing environment;
presenting, to the user or the second user, the temporary computing environment;
obtaining the third user input via a third graphical user interface, the third user input being provided by the user or the second user responsive to the presentation of the temporary computing environment.

18. The data processing system of claim 17, wherein the explicit intent indicates a first quantity of computing resources, the inferred intent indicates a second quantity of computing resources, and the intermediate representation implicates deployment of a quantity of computing resources between the first quantity of computing resources and the second quantity of computing resources.

19. The data processing system of claim 18, wherein the third user input indicates a quality rating of computer implemented services provided by the temporary computing environment.

20. The data processing system of claim 19, wherein obtaining the data package indicating use of the computing environment by the user comprises:
identifying a metric based at least in part on the difference;
instantiating an agent in the computing environment, the computing environment being used by the client to receive computer implemented services;
monitoring, using the agent, the metric with respect to the computer implemented services; and
obtaining the data package based on the monitoring of the metric.

* * * * *